Feb. 6, 1951 L. M. POTTS 2,540,287

PRINTING TELEGRAPH SYSTEM AND APPARATUS

Filed June 4, 1947 14 Sheets-Sheet 1

INVENTOR
LOUIS M. POTTS, DECEASED
MARTHA W. C. POTTS, EXECUTRIX
BY Emery Robinson
ATTORNEY Feb. 6, 1951

L. M. POTTS 2,540,287

PRINTING TELEGRAPH SYSTEM AND APPARATUS

Filed June 4, 1947

14 Sheets-Sheet 2

INVENTOR
LOUIS M. POTTS, DECEASED
MARTHA W. C. POTTS, EXECUTRIX
BY Emery Robinson
ATTORNEY Feb. 6, 1951 L. M. POTTS 2,540,287

PRINTING TELEGRAPH SYSTEM AND APPARATUS

Filed June 4, 1947 14 Sheets-Sheet 3

INVENTOR
LOUIS M. POTTS, DECEASED
MARTHA W. C. POTTS, EXECUTRIX
BY Emery Robinson
ATTORNEY

PRINTING TELEGRAPH SYSTEM AND APPARATUS

Filed June 4, 1947

INVENTOR
LOUIS M. POTTS, DECEASED
MARTHA W.C. POTTS, EXECUTRIX
BY Emery Robinson
ATTORNEY

PRINTING TELEGRAPH SYSTEM AND APPARATUS

Filed June 4, 1947 14 Sheets-Sheet 5

INVENTOR
LOUIS M. POTTS, DECEASED
MARTHA W.C. POTTS, EXECUTRIX
BY Emery Robinson
ATTORNEY Feb. 6, 1951 L. M. POTTS 2,540,287

PRINTING TELEGRAPH SYSTEM AND APPARATUS

Filed June 4, 1947 14 Sheets-Sheet 6

INVENTOR
LOUIS M. POTTS, DECEASED
MARTHA W. C. POTTS, EXECUTRIX
BY Emery Robinson
ATTORNEY Feb. 6, 1951 L. M. POTTS 2,540,287

PRINTING TELEGRAPH SYSTEM AND APPARATUS

Filed June 4, 1947 14 Sheets-Sheet 7

INVENTOR
LOUIS M. POTTS, DECEASED
MARTHA W. C. POTTS, EXECUTRIX
BY Emery Robinson
ATTORNEY

PRINTING TELEGRAPH SYSTEM AND APPARATUS

Filed June 4, 1947 14 Sheets-Sheet 8

INVENTOR
LOUIS M. POTTS, DECEASED
MARTHA W. C. POTTS, EXECUTRIX
BY Emery Robinson
ATTORNEY Feb. 6, 1951 L. M. POTTS 2,540,287

PRINTING TELEGRAPH SYSTEM AND APPARATUS

Filed June 4, 1947 14 Sheets-Sheet 9

INVENTOR
LOUIS M. POTTS, DECEASED
MARTHA W. C. POTTS, EXECUTRIX
BY
Emery Robinson
ATTORNEY INVENTOR
LOUIS M. POTTS, DECEASED
MARTHA W. C. POTTS, EXECUTRIX
BY Emery Robinson
ATTORNEY Feb. 6, 1951 L. M. POTTS 2,540,287

PRINTING TELEGRAPH SYSTEM AND APPARATUS

Filed June 4, 1947 14 Sheets-Sheet 11

INVENTOR
LOUIS M. POTTS, DECEASED
MARTHA W. C. POTTS, EXECUTRIX
BY
Emery Robinson
ATTORNEY

PRINTING TELEGRAPH SYSTEM AND APPARATUS

Filed June 4, 1947 14 Sheets-Sheet 12

INVENTOR
LOUIS M. POTTS, DECEASED
MARTHA W. C. POTTS, EXECUTRIX
BY
Emery Robinson
ATTORNEY

PRINTING TELEGRAPH SYSTEM AND APPARATUS

Filed June 4, 1947 14 Sheets-Sheet 13

INVENTOR
LOUIS M. POTTS, DECEASED
MARTHA W. C. POTTS, EXECUTRIX
BY
Emery Robinson
ATTORNEY INVENTOR
LOUIS M. POTTS, DECEASED
MARTHA W. C. POTTS, EXECUTRIX
BY Emery Robinson ATTORNEY Patented Feb. 6, 1951

2,540,287

UNITED STATES PATENT OFFICE 2,540,287

PRINTING TELEGRAPH SYSTEM AND APPARATUS

Louis M. Potts, deceased, late of Evanston, Ill., by Martha W. C. Potts, executrix, Evanston, Ill., assignor to Teletype Corporation, Chicago, Ill., a corporation of Delaware Application June 4, 1947, Serial No. 752,512

15 Claims. (Cl. 178—23)

This invention relates to printing telegraph systems and apparatus, and particularly to systems wherein printing telegraph apparatus is used for recording code marks on a page form and the form is subsequently scanned by a photoelectric transmitter which transmits signals accordingly.

An object of the invention is to provide a printing telegraph system utilizing printing telegraph apparatus for reproducing on a page form both printed characters and corresponding code marks, and in which the code marks so provided are scanned by a photoelectric transmitter for transmission purposes.

Another object of the invention is to provide printing telegraph apparatus for recording code marks on the rear of a page form which corresponds to related printed characters reproduced on the front of the page form.

An additional object of the invention is to provide a printer which converts one equal length code having shift signals to another equal length code having no shift signals.

Another object of the invention is to provide photoelectric transmitting apparatus which scans a page form having code marks thereon, line by line, and transmits signals according to the code marks so scanned.

A further object of the invention is to provide a photoelectric transmitter which converts the signal representations of one equal length code into the signal representations of another equal length code with automatically inserted shift signals.

Still another object of the invention is to provide a photoelectric transmitter which automatically transmits a carriage return signal.

A feature of the invention is the use of a traveling projector in a photoelectric transmitter which after completing the scanning of a line of code marks on a page form is automatically returned to its beginning of line position preparatory to scanning the next line of code marks. When the projector reaches the beginning of line position, the page form is advanced to place the next line of code marks in scanning position.

Another feature of the invention is the use of a pivoted projector for scanning control form indicia wherein the focal length of the projector is automatically adjusted according to the area of the form being scanned.

Other objects, features, and advantages of the invention, although not specifically recited above, will become apparent as the invention is later described in detail.

One form of page printer used in the present invention is of the type shown in the patent of A. H. Reiber, No. 2,247,408, dated July 1, 1941. The selector mechanism disclosed in the Reiber patent has been modified so that in addition to controlling the stop or printing position of a type wheel, it also establishes a selection for a series of six code mark printing elements which cause printed code marks to be impressed on the rear of the page form in a vertical line with, and above, corresponding printed characters reproduced on the front of the page form. Five of the code mark printing elements are operable from the selector mechanism proper while the sixth code mark printing element is controlled by the position of the case shifting mechanism. For code mark inking purposes, either a stamp pad or an ordinary inking ribbon is used. With each code mark printing operation, two smaller code marks are universally printed for control purposes when the code marks are scanned by the photoelectric transmitter. One of the feed marks is centralized with respect to the code marks while the other is slightly offset to the right (when looking at the rear of the page form) so that there is always a feed mark in the margin for beginning of line control purposes.

A second form of page printer used in the present invention is of the general type shown in the patent of Morton et al., No. 1,904,164, dated April 18, 1932. A secondary selector mechanism for code mark printing is provided with this page printer, which is controlled from the printer vanes, and is movable with the type basket. Again the code marks are printed on the rear of the page form in a vertical line above the corresponding printed characters reproduced on the front of the page form. Each of the page printers utilized in the present invention, in response to a five unit code signal prints a six unit code and, thus, in effect acts as a translator.

The photoelectric transmitter includes a pivotally mounted projector whose free end moves across a line of code marks reproduced on a page form, stopping at each code combination to transmit the signal and then resuming its travel to the next code combination. When the end of the line is reached, the projector is automatically returned to the beginning of line position as a new line of code marks is fed into scanning position. Sequential transmission of the code impulses and the start-stop impulses by operation of a photoamplifier tube, is obtained by means of a scanning disc. The scanning disc consists of an opaque circular plate having arcuate transparent areas arranged at different radial distances and in different angular positions about the center point. These arcuate areas represent the six elements of the code combination and the stop impulse. A start impulse is a no current impulse and therefore no transparent area is provided in this case, the opacity of the circular plate being relied upon to send the start impulse. The feed marks are scanned by a continuous transparent ring of the scanning disc when a shutter is in one of its two positions, and at this time the code marks are blocked. In its other postion, the shutter permits scanning of the code marks and blocks scanning of the feed marks. A suitable circuit arrangement is provided for use with this photoelectric transmitter for the transmission of a six unit code signal.

The invention also provides a modified form of transmitter which converts the six unit code into a five unit code with automatically inserted shift and unshift signals and carriage return signals. However, it should be pointed out that the photoelectric transmitting apparatus disclosed herein, is designed to be used either in the six unit code system, or in the five unit code system. A different circuit arrangement is used in conjunction with the photoelectric transmitter designed to transmit five unit code signals.

In each of the photoelectric transmitters, provision is made should abnormal spacing occur between code mark combinations. When this condition is encountered, the stop impulse between characters is prolonged and thus no detrimental results will occur at the receiving end of the line since in start-stop telegraph practice the receiving cam sleeve would be held in its stop position until a start impulse is received. The transmission of the code combination of the abnormally spaced characters is in this way delayed but is transmitted intact without impairing transmission.

A more ready comprehension of the invention may be had by reference to the following detailed description when read in conjunction with the drawings wherein.

Figures 10, 11, 11A:
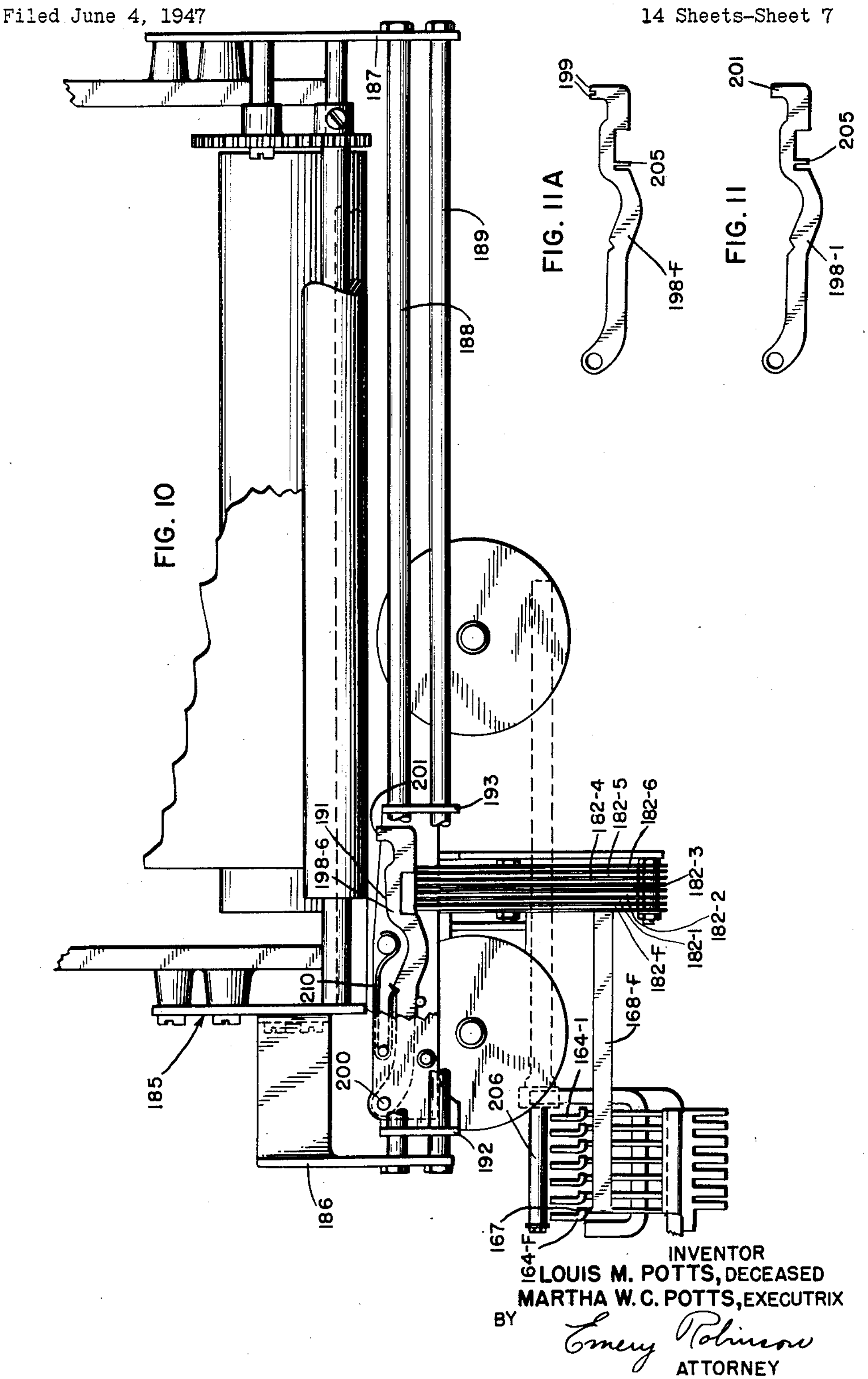
Fig. 10 is a partial plan view of the same printer.
Fig. 11 is a detailed view of a code mark printing lever.
Figures 12, 12A:
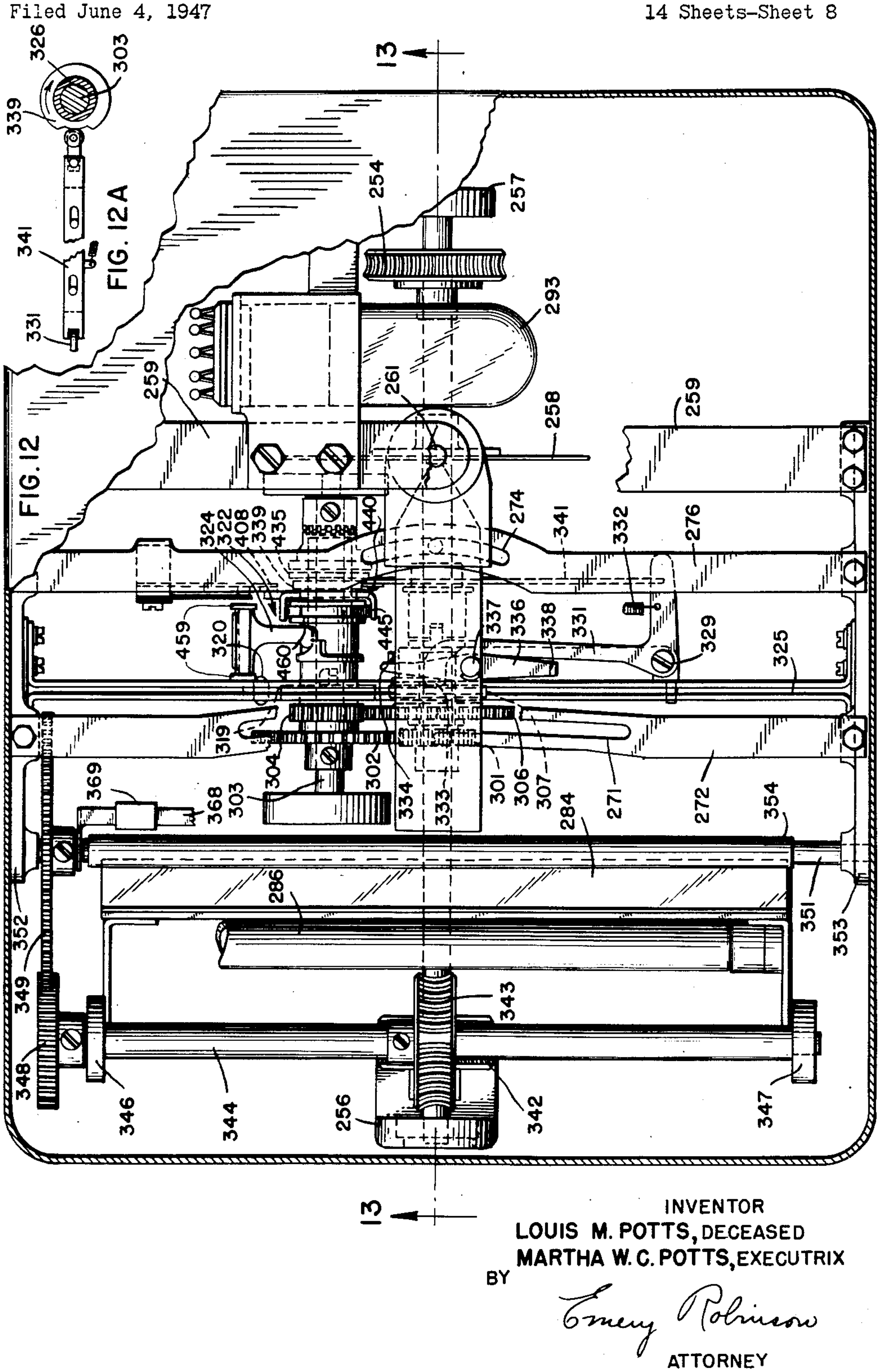
Figure 13:
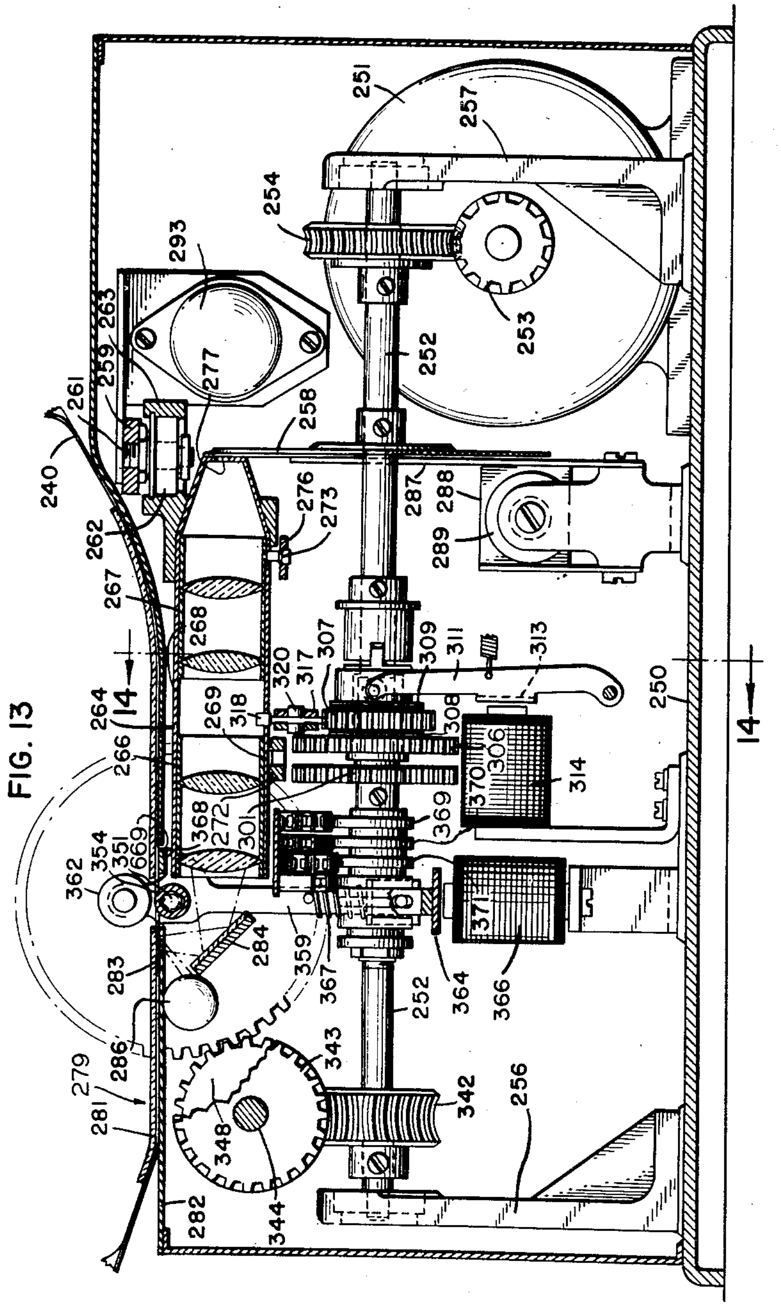
Figure 14:
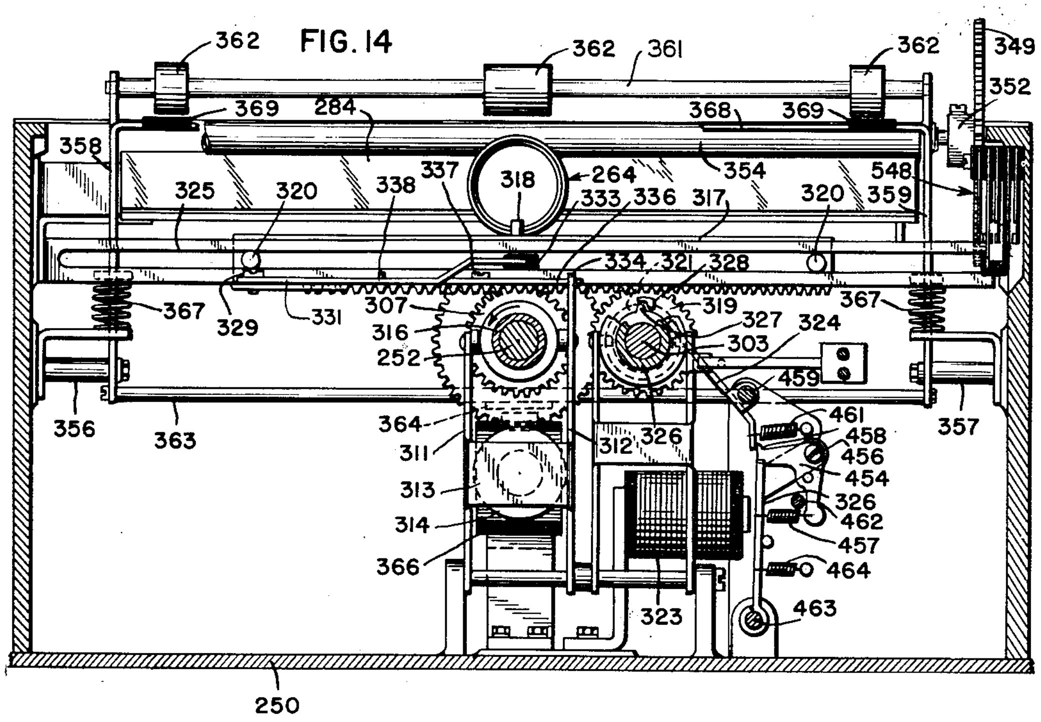
Figure 15:
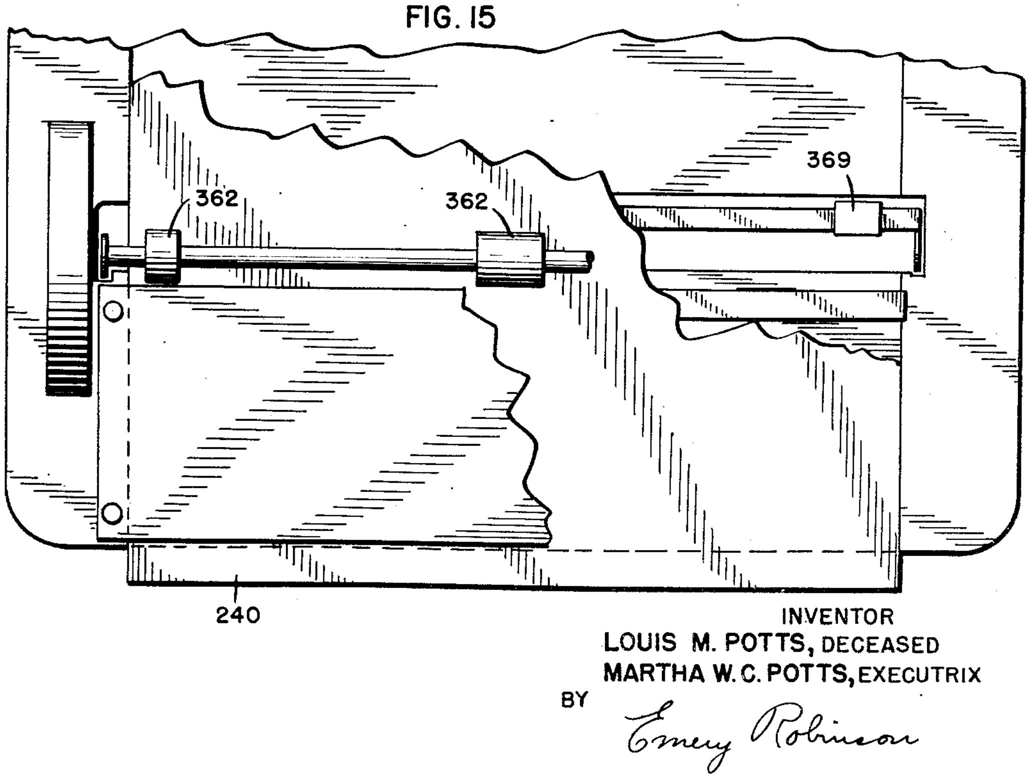
Figure 16:
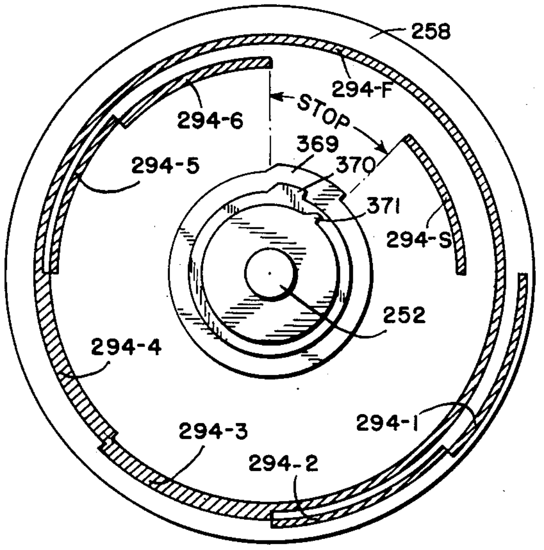
Figure 18:
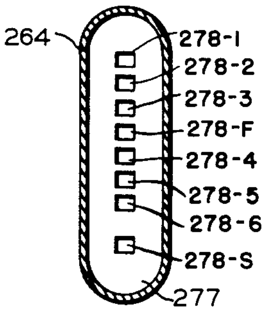
Figure 19:
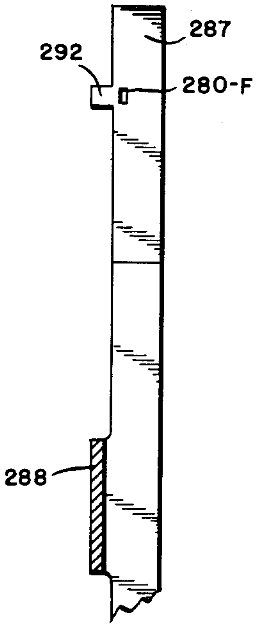
Figure 17:
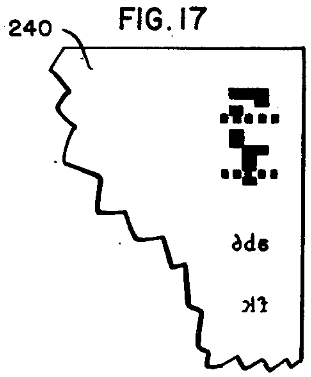
Figure 16A:
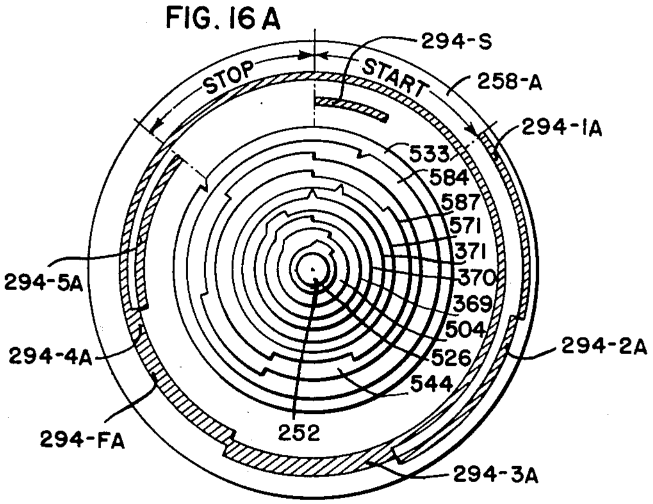
Figure 18A:
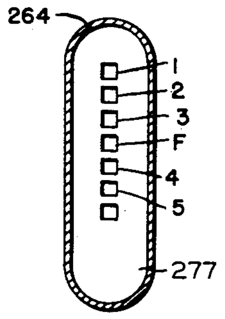
Figure 19A:
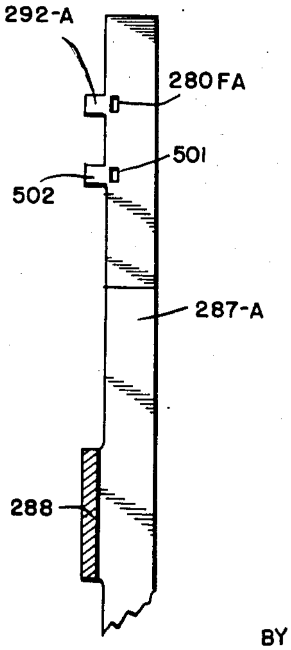
Figure 17A:
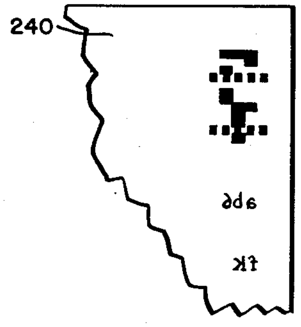
Figure 20:
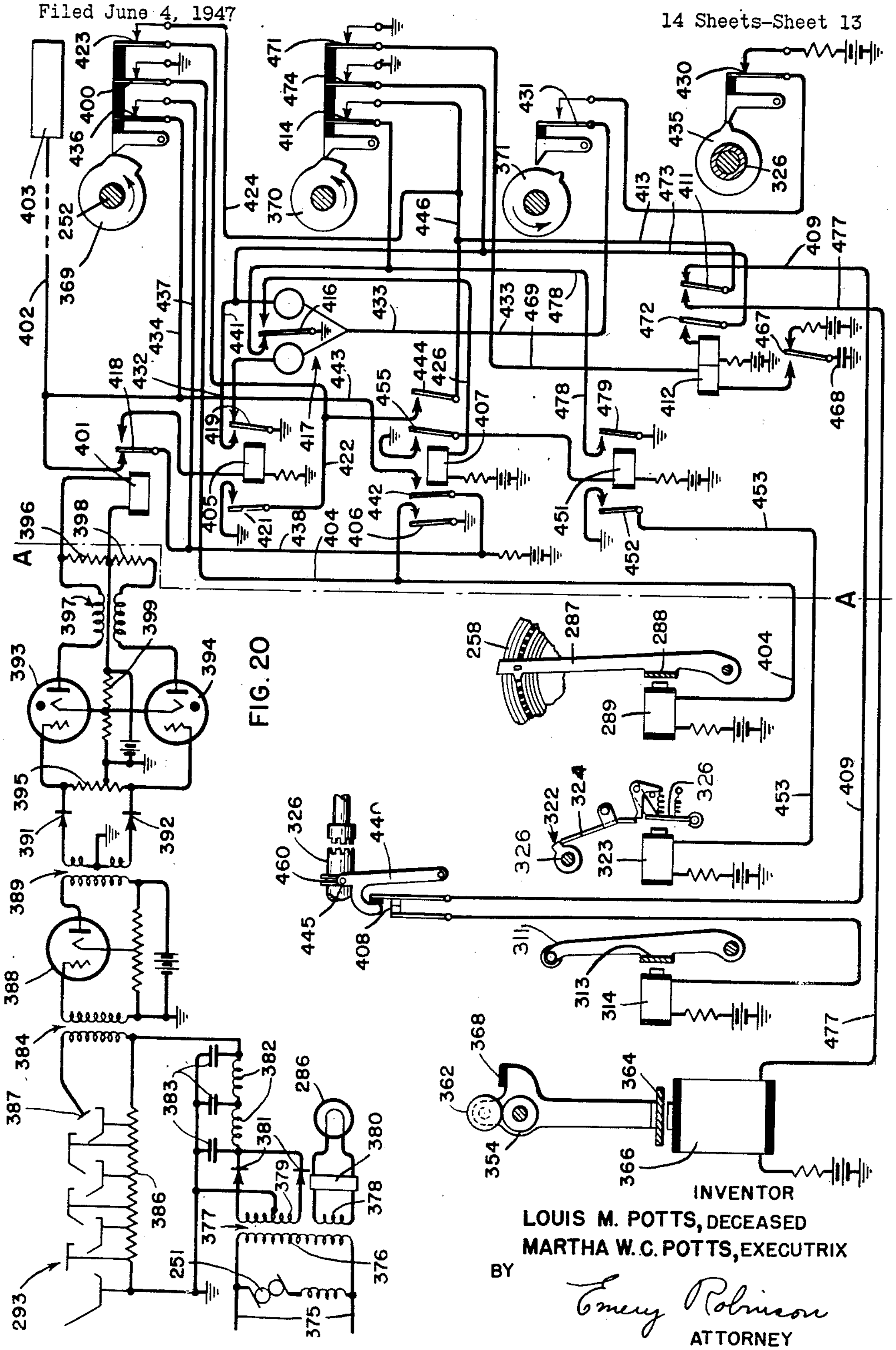

Fig. 11*a* is a detailed view of the feed mark printing lever;

Fig. 12 is a plan view of the photoelectric transmitting apparatus with parts broken away and parts omitted to avoid confusion in the drawings;

Fig. 12*a* is a detail of a braking mechanism which forms part of the photoelectric transmitter;

Fig. 13 is a section view of the photoelectric transmitter taken on the line 13—13 of Fig. 12;

Fig. 14 is a section view of the transmitting apparatus taken on the line 14—14 of Fig. 13;

Fig. 15 is a partial plan view of the transmitting apparatus devoted particularly to the feeding of the page form;

Fig. 16 is a detailed view of the scanning disc used in connection with transmission of a six unit code;

Fig. 16*a* is a detailed view of the scanning disc used in connection with transmission of a five unit code;

Fig. 17 is a rear view of a page form illustrating printed code mark combinations and feed marks;

Fig. 17*a* is a view identical with that shown in Fig. 17 and duplicated for convenience in reading the specification;

Fig. 18 is an enlarged detail view of the end of the projector used for six unit code transmission particularly for the purpose of showing the code mark and feed mark openings;

Fig. 18*a* is an enlarged detail view of the end of the projector used for five unit code transmission particularly for the purpose of showing the code mark and feed mark openings;

Fig. 19 is a detail of the shutter used for six unit code transmission;

Fig. 19*a* is a detail of the shutter used for five unit code transmission;

Fig. 20 is a circuit arrangement used for six unit code transmission; and

Figure 21:
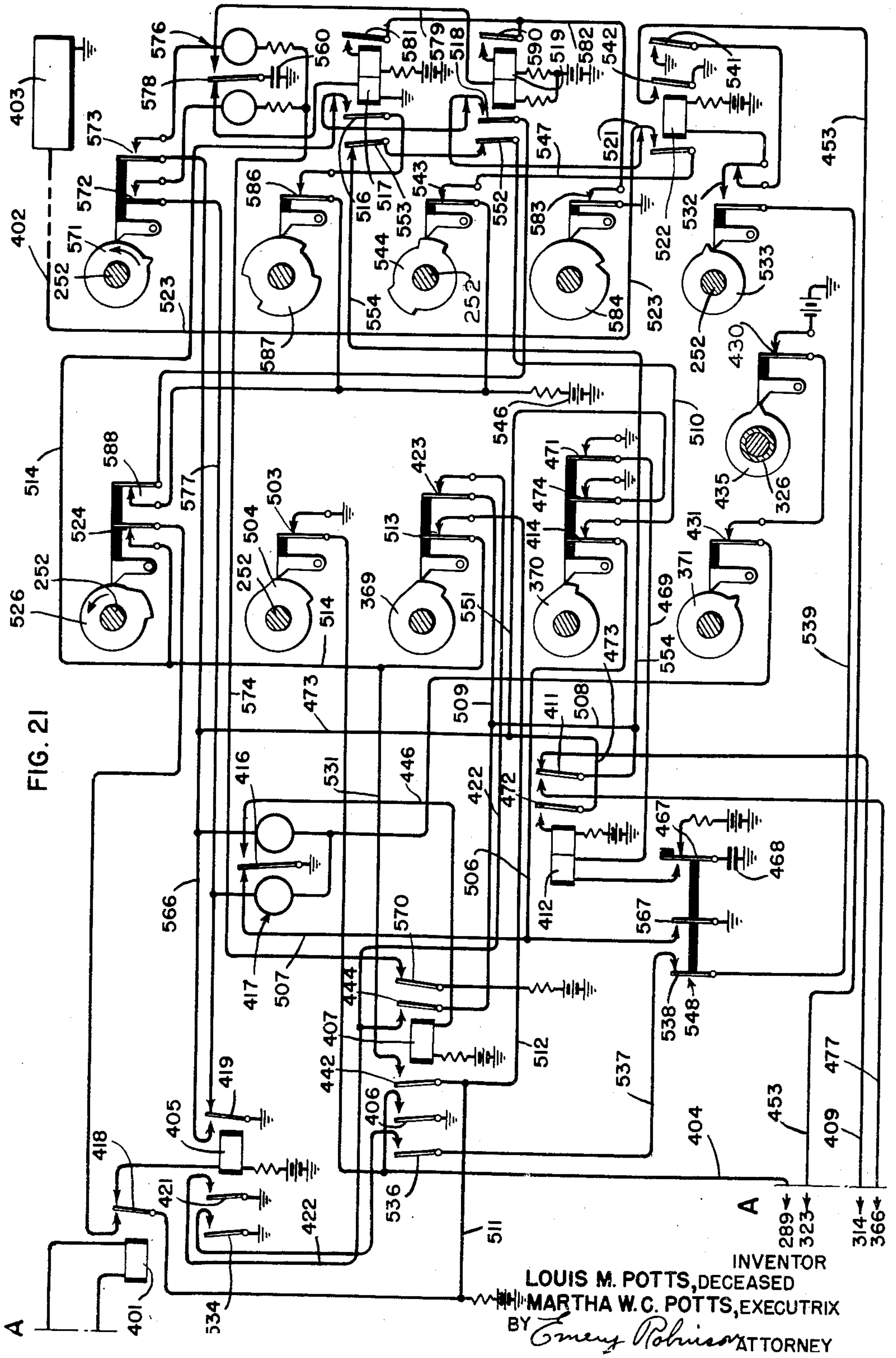

Fig. 21 is a circuit arrangement used for five unit code transmission.

Referring now particularly to Figs. 1 to 7, the first form of page printer used in the present invention will be described, it being understood that the page printer now being considered is of the general type disclosed in the hereinbefore mentioned Reiber patent. Numeral 51 (Fig. 1) represents a selector cam assembly which by means of a sword and T-lever selector mechanism (not shown), controls a setting of five selector levers 52 pivoted at 50 (Fig. 7), as is fully shown and described in the Reiber patent. Levers 52 are bifurcated at 53 for articulation to associated bell crank transfer levers 54, which are engaged in notches 60 of code disc selectors 56 to thereby control the setting thereof. Positioning of code disc selectors 56 in turn governs the selection of a particular stop pin 57 which determines the stop position of type wheel 55 in a manner well known in the art.

After the type wheel 55 has been brought to rest, one of the type pallets 58 carried thereby, in either the upper or lower row of type pallets is engaged by a print hammer 59 to cause the printing of a selected character. The row of type pallets selected by the print hammer 59 is determined by the case shift position of a type wheel supporting frame 61 at the top of which rests the type wheel 55. In each cycle of operation, a lever 62 operable from a cam, shown in the Reiber patent, moves upward and by means of spring 63 draws frame 61 also in an upward direction, causing the frame to lift the type wheel to its selected case position. A lug 64 carried by frame 61 may engage either shoulder 66 or shoulder 67 of a horizontal slide 68 to thereby limit the upward movement of frame 61 to one or the other of its case positions. Horizontal slide 68 is positioned under the control of function levers (not shown) either to its rightward or lower case position, or to its leftward or upper case position as is fully described in the Reiber patent. When slide 68 is in its rightward position, type pallets 58 of the upper row may be operated by the print hammer 59 and when slide 68 is in its leftward position, type pallets 58 of the lower row are operated by the print hammer 59.

Returning now to the selector mechanism, the five selector levers 52 are each modified in accordance with the present invention to include a rounded projection 69, engaging the notches 71 of five associated slides 72 which are suitably mounted for sliding motion on pins 73 and 70. A sixth slide 72S is also provided which is of slightly different configuration than slides 72 and is mounted on pin 73 at the top of the slides 72. Formed only on the slide 72S is a notch 74 designed to be engaged by the upper end of a lever 76 which is pivoted at 77, the lower end of 76 rests in notch 78 of previously identified horizontal slide 68, and thus slide 72S is shifted to the case position occupied by horizontal slide 68 while the remaining five slides 72 are under control of a sword and T-selector mechanism (details of which are not shown).

Each of the slides 72 and 72S are provided with a single progressively arranged projection 79, which engages in a notch (not shown) of a series of vertically extending rods 82, 82S, suitably mounted in the apparatus for rotatable movement. The upper end of each rod 82 is provided with a notch 83 engageable by a projection 84 of slides 86, 86S, mounted for slidable movement on pins 75 which are in alignment with pins 73. Formed on each of the upper slides 86, 86S, is a bifurcation 87, in which is nested an arm of an associated bell crank transfer lever 85, pivoted at 88 and having its other arm in engagement with a notch 89 of a third series of slides 91, 91S.

Slides 91 and 91S are each nested for slidable movement within associated code mark levers 92—1 to 92—6 which are pivoted about the rod 93. Slide 91S is related to the sixth code lever 92—6, since by means of the page printer now being considered, a five unit code may be transposed into a six unit printed code. Slides 91—1, 91S are guided within their associated code mark levers 92—1 to 92—6 by means of the retaining portion 94 and 95 of the code mark levers. Each of the slides 92—1 to 92—6 are provided with printing projections 97. Slides 91, 91S are provided with interfering projection 98, which may be shifted into the path of auxiliary print hammer 99 carried by the main print hammer 59 in response to a marking impulse or will be shifted out of the path of auxiliary hammer 99 in response to a spacing impulse. A feed mark lever 101 (Fig. 5) having two small feed mark projections 102, is also mounted on rod 93 and includes an interfering projection 103 which is universally engaged by auxiliary print hammer 99. Because of the universal operation of feed mark lever 101, no slide is provided in this case to govern its operation. Leaf springs 100 normally urge levers 92—1 to 92—6 and lever 101 towards the front of the apparatus.

Referring again to the lower slides 72, 72S, it is to be observed that the slide 72S is the topmost of the five. However, its related upper slide 86S is connected to vertical rod 82S so as to be at the bottom of the upper slides 86. It is apparent from an inspection of either Fig. 2 or Fig. 6 that the code mark levers 92—1 to 92—6 are arranged in that order from top to bottom and that the feed mark lever 101 is interposed between levers 92—3 and 92—4.

The auxiliary print hammer 99 is slidably carried on the print hammer 59 by means of pins 102 which ride in a slot 103 formed on print hammer 59. A spring 104 interconnects the auxiliary print hammer 99 with the main print hammer 59 to urge the auxiliary hammer 99 in a direction towards the code mark printing platen 106. This provides a slight yield in the parts which insures that when a character is printed by the operation of the main print hammer 59 engaging a selected type pallet 58, corresponding code marks will be printed by operation of the print hammer 99. In other words, auxiliary print hammer 99, by reason of this construction, will always travel far enough to cause the printing of code mark impressions. To suppress printing during shift and unshift operations, print hammer 59 is provided with a lug 107 (Fig. 2) which may engage either of two lugs 108 (only one of which is shown in the drawing) carried by the type wheel 55 and be blocked thereby. Thus, according to the position assumed by selector lever 52, and by lever 76, which is under the control of horizontal slide 68, code mark levers 92—1 to 92—6 will be selectively operated by auxiliary print hammer 99 according to whether or not their associated interfering projections 97 are positioned in the path of the auxiliary print hammer.

Mounted on the carriage 109, is a shaft 111 which supports the main platen 112 in the usual manner. Added to shaft 111 is a gear 113 which is in mesh with an intermediate gear 114 which in turn drives the gear 116. This latter gear is attached to shaft 117 which carries the auxiliary paper feed rollers 118. Cooperating with feed rollers 118 are pressure rollers 119 carried by a shaft 121 rotatably supported at either end on the bell crank 122 which are pivoted at 123, springs 125 (only one of which is shown) urge bell crank 122 in a counterclockwise direction as viewed in Fig. 2 to bias the pressure rollers 119 into engagement with auxiliary paper feed rollers 118.

Figure 1:
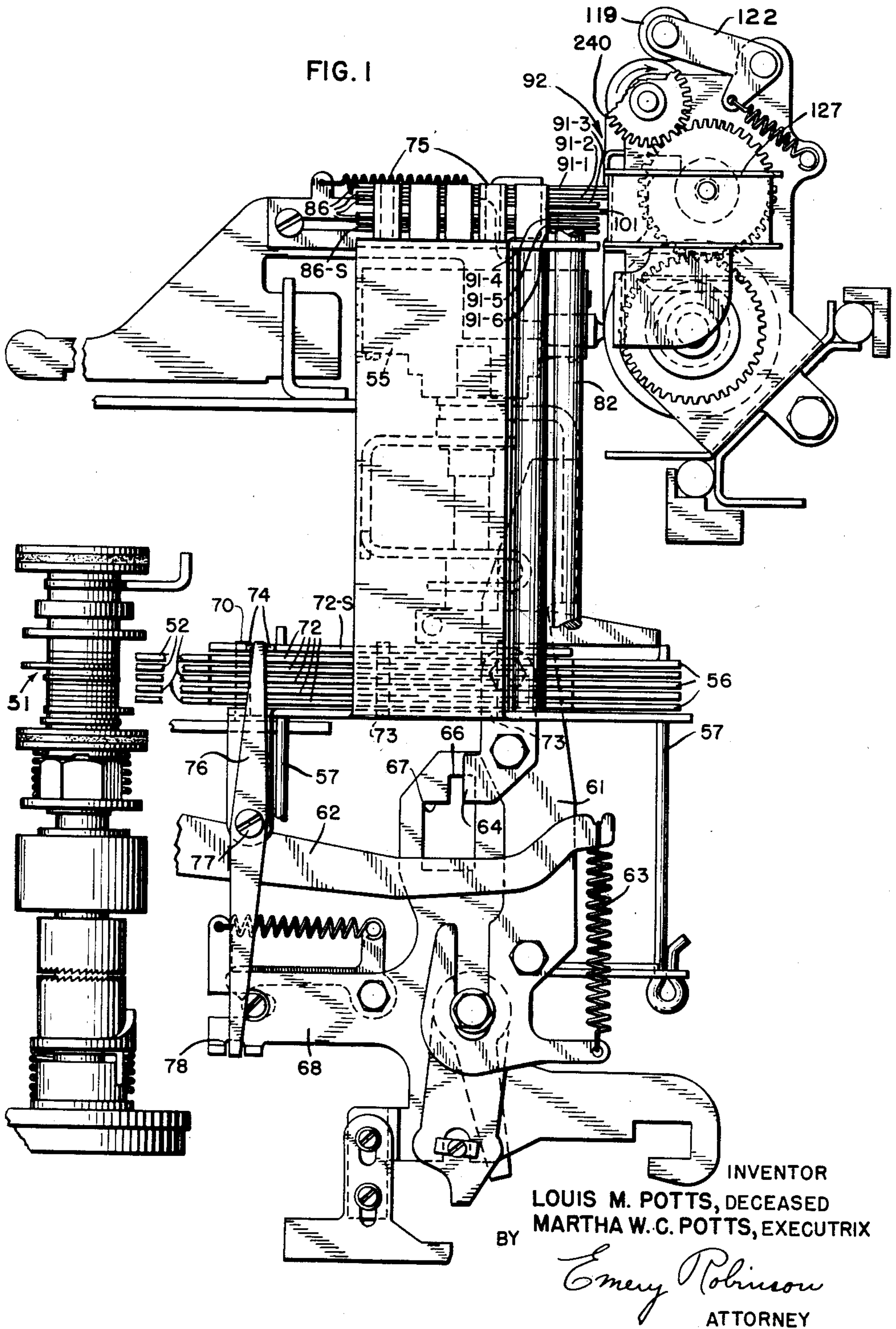
Fig. 1 is a partial elevational view of a modified page printer of the type disclosed in the Reiber patent taken at the right-hand side thereof.
Figures 2, 6:
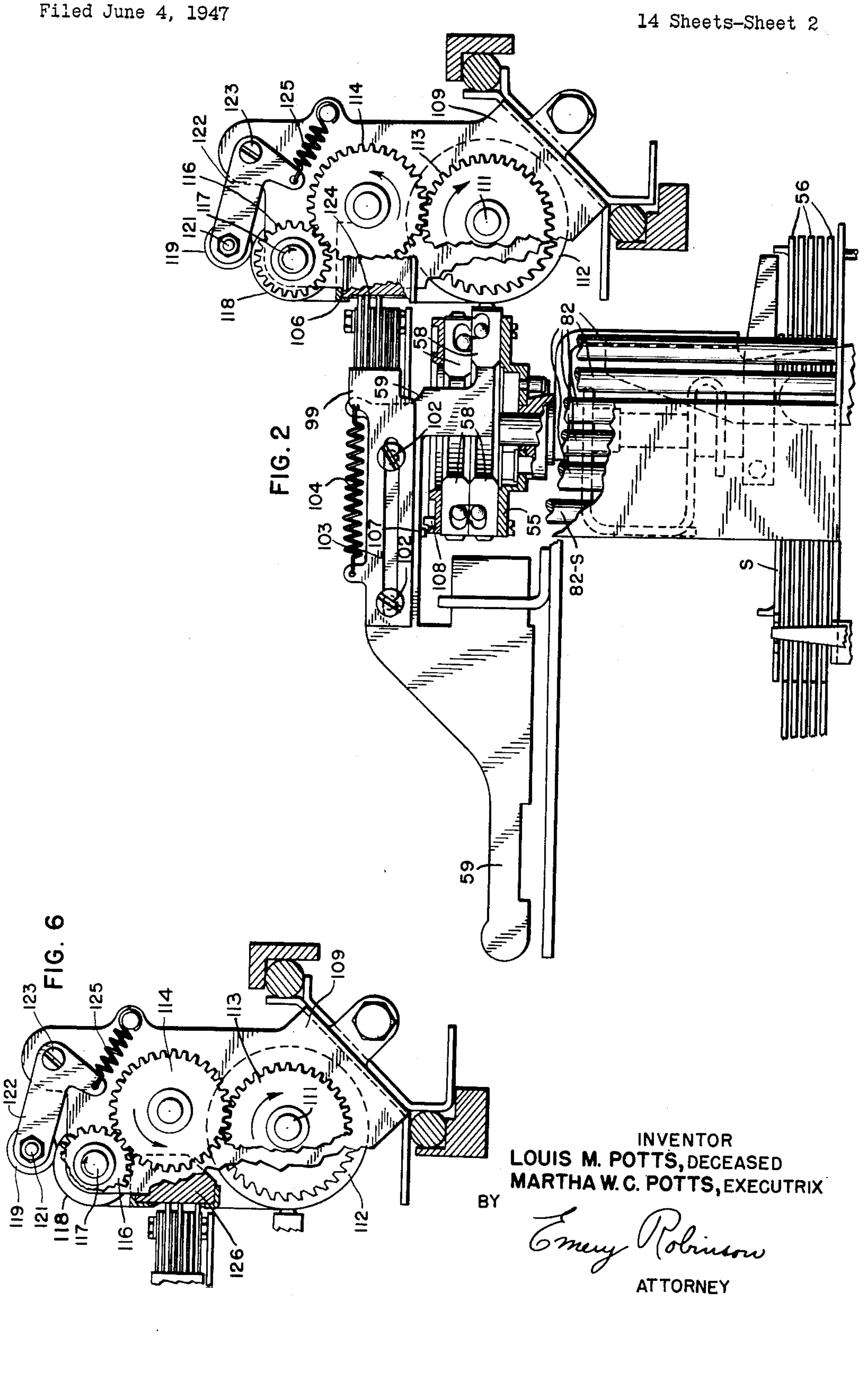
Fig. 2 is a detailed view of the same printer particularly illustrating portions of the code mark printing mechanism involved in the present invention.
Fig. 6 is a detailed view of the same page printer showing the use of a stamp pad instead of a ribbon for inking purposes.
Figure 3:
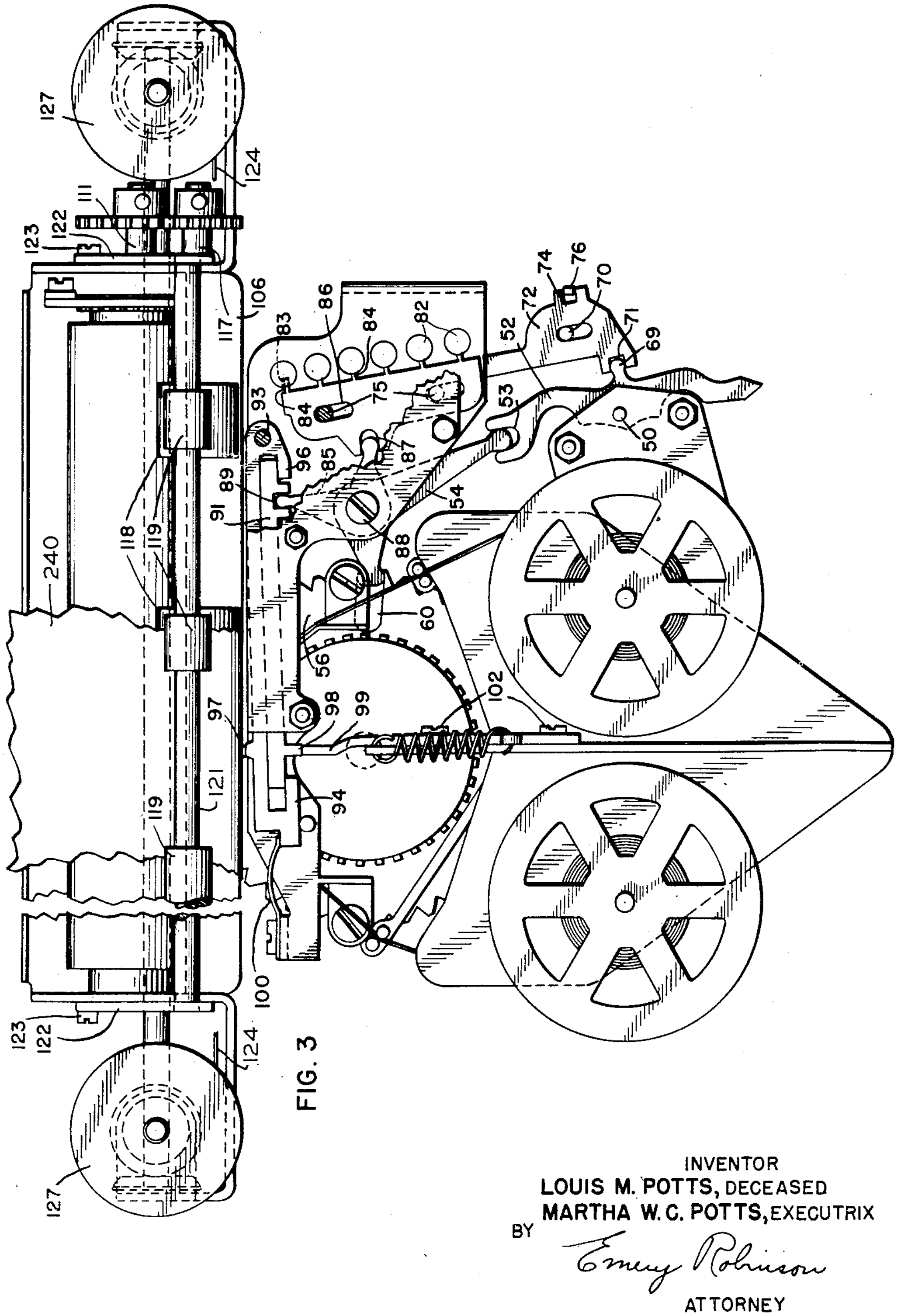
Fig. 3 is a partial plan view of the same page printer.
Figures 4, 5, 7:
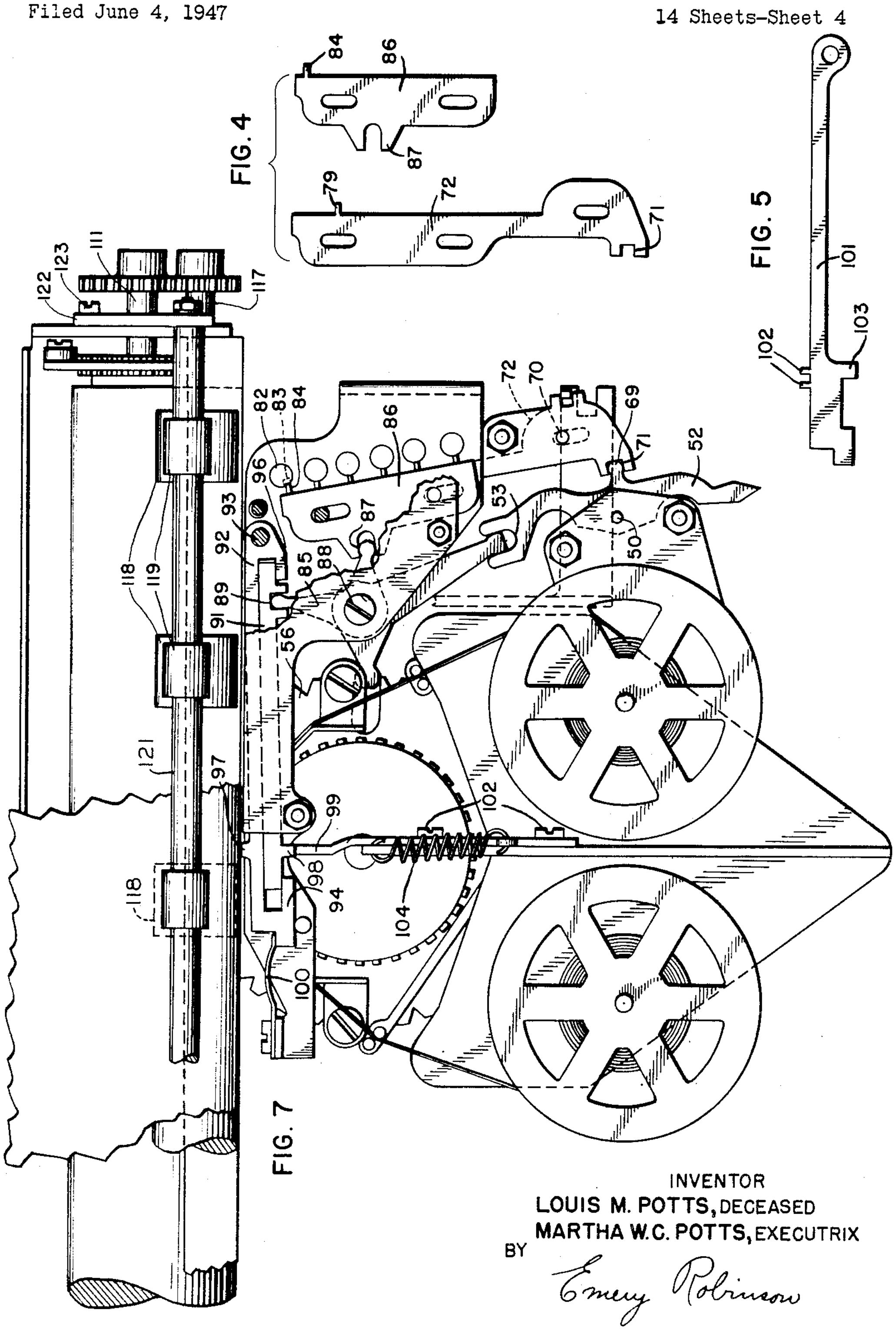
Fig. 4 is a detailed view of the selector slides provided in the present invention.
Fig. 5 is a detailed view of the feed mark printing levers utilized in the present invention.
Fig. 7 is a plan view of the page printer wherein the stamp pad is used in place of the ribbon for inking purposes.
Figure 8:
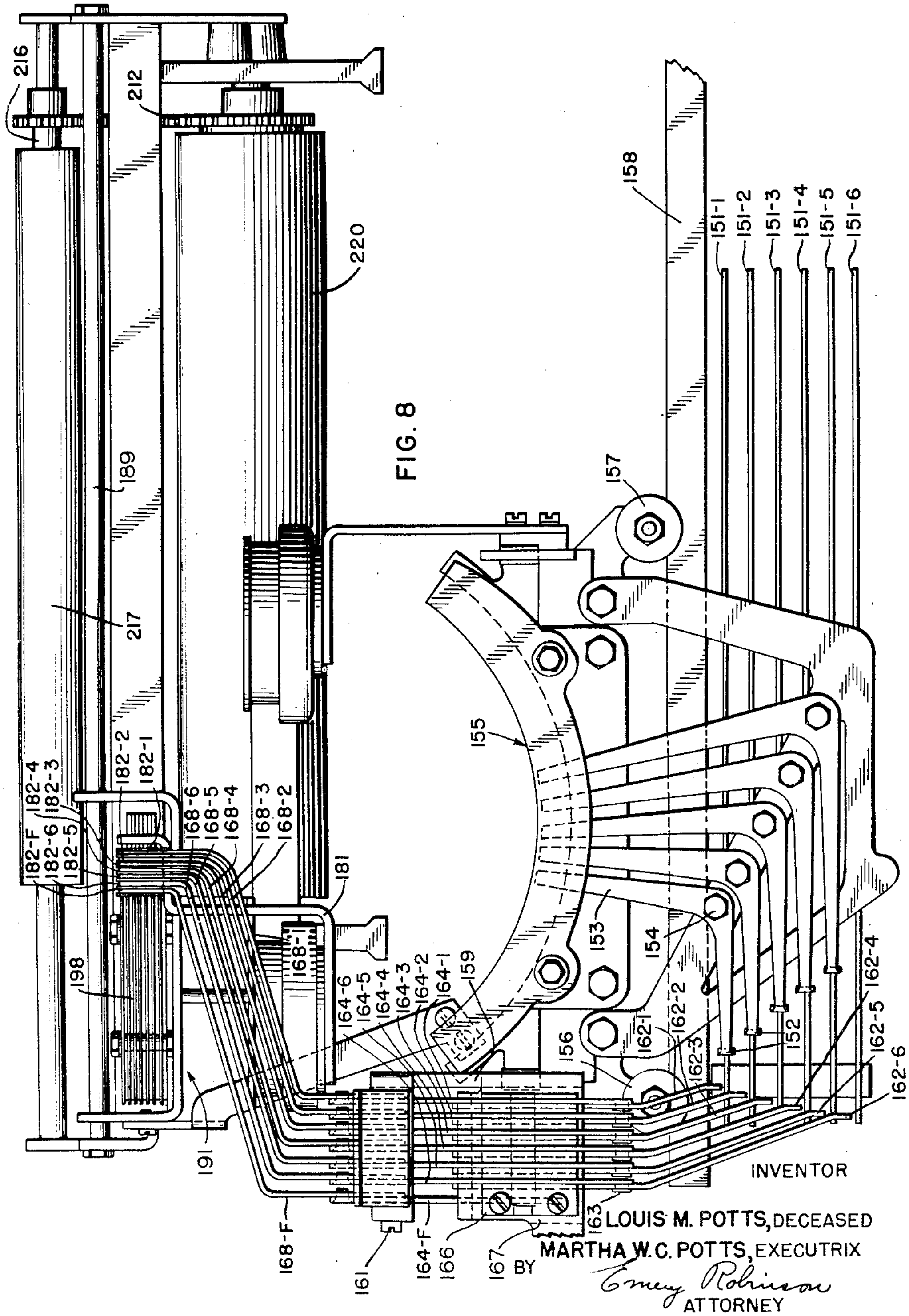
Fig. 8 is a partial front view of a modified printer of the type shown in the Morton et al. patent.

In Figs. 1, 2, and 3 it is contemplated that an inking ribbon 124 is to be used as an inking medium, while in Figs. 6 and 7, a stamp pad 126 is used for inking purposes. Otherwise, the disclosure of Figs. 6 and 7 is consistent with the disclosure of Figs. 1, 2, and 3. The ribbon 126 is fed between spools 127 in any convenient manner and said spools may be provided with any conventional ribbon reverse mechanism. The ribbon is fed across the rear of the page form adjacent to platen 106. When multiple copies are being printed, the original or top form, is fed over the auxiliary feed rollers 118 and receives code mark impression while the other copies may be fed out over the standard platen 112. It will be understood that the feeding pressure applied by rolls 118 and 119 to the top page form will not be greater than the feeding pressure applied by the platen 112, so that platen 112 dominates the advancement of the paper. The rate of feed provided by rolls 118 and 119 may be approximately the same, or slightly greater than the rate of feed provided by platen 112 in order to maintain the page form 240 taut. In Figs. 6 and 7, the inking ribbon is dispensed with and a stamp pad 126 is substituted therefor in the position formerly occupied by the platen 106.

With particular reference to Figs. 8 to 11, a second form of code mark page printer contemplated by the present invention will be described, it being understood that this printer is of the general type shown in this patent of Morton et al., No. 1,904,164, dated April 18, 1933, with modifications in accordance with the present invention. Numerals 151—1 to 151—5 represent printer vanes which are operable under the control of a sword and T-selector mechanism (not shown) as is fully described in the patent of Morton et al. A sixth or shift vane 151—6 is also provided which moves to one case position in response to a shift signal and remains in such position until an unshift signal is received. Vanes 151—1 to 151—5 are each engaged at 152 by one arm of bell crank 153 which pivots at 154 on the type basket 155 to select a character for printing as is also fully described in the Morton et al. patent. The type basket is movable across the front of the printer on rollers 156, 157 which ride on the rod 158 in a manner well known in the art.

Suitably attached to the type basket 155 is a bracket 159 which pivotally supports at 161 a series of levers 164—1 to 164—6. Also pivoted at point 161 is a feed control lever 164F of a different configuration than levers 164—1 to 164—6, which controls the printing of the feed marks. Each of the levers 164—1 to 164—6 are guided in slots of a comb 166 carried by the bracket 159 and are provided with individual lugs 167, which rest against the rear of associated vertically extending levers 168—1 to 168—6. Levers 168—1 to 168—6 are also pivoted at 161 and are interconnected with associated levers 164—1 to 164—6 by means of connecting springs 171. Normally the projections 172 carried by the vertically extending levers 168—1 to 168—6 rest against a backstop 173 carried by the bracket 159. Lever 164—F and a lever 168—F are similarly interconnected by means of a spring 171. Levers 162—1 to 162—6 are each supported at 163 on associated levers 164—1 to 164—6 and are normally urged in a counterclockwise direction by means of springs 174. The tops of the levers 162—1 to 162—6 are guided in slots of a comb 176 carried by bracket 159. A spring 177 normally urges the lever 164—F about the pivot 161. Mounted on frame 181, which by means of a downwardly extending arm 180 is suitably attached to the type basket 155, are a series of slides 182—F and 182—1 to 182—6. Slides 182—F and 182—1 to 182—6 are slidably mounted on the pins 183 and 184 and are designed to be engaged at their notched portions 186 by associated vertically extending levers 168—F and 168—1 to 168—6.

Carried at either side of the platen carriage 185 are brackets 186, 187, which support the end of guide rods 188, 189, designed to be traversed by a frame 191 by means of its flanges 192 and 193. Frame 191 carries a shoulder screw 194 which rests in the bifurcation 196 of an upwardly extending arm 197 which is carried by the type basket 155. Thus, although the frame 191 may be shifted vertically during a case shifting operation, bifurcation 196 of arm 197 by reason of its engagement with shoulder screw 194 will permit the frame 191 to follow the movements of the type basket 155. Pivotally mounted at 200 on the frame 191 are a series of code mark levers 198—1 to 198—6 and a feed mark lever 198—F (Fig. 11) which are normally urged towards the front of the apparatus by individual springs 210. Lever 198—F is provided with two printing elements 199 while the code mark levers 198—1 to 198—6 are provided with a single larger marking projection 201 which is in a vertical line above the character printing position. Each of the slides 182—F, 182—1 to 182—6 is provided with an upper interfering projection 202U and a lower interfering projection 202L either of which is operable, depending upon the case position of the platen to which the frame 191 has been moved. Projections 202U are longer than projections 202L since, when the platen is shifted to its upper case position, it pivots and moves a slight distance away from the front of the machine. It is therefore necessary that in its upper case position, the upper projections 202U be long enough to engage projections 205 of their associated code mark levers or code feed levers as the case may be. Projections 205 of each code mark lever 198—1 to 198—6 and feed mark lever 198—F are progressively arranged so that each interfering projections 202U, 202L of associated slides 182—1 to 182—6, 182—F, may operate only its corresponding lever.

Figure 9:
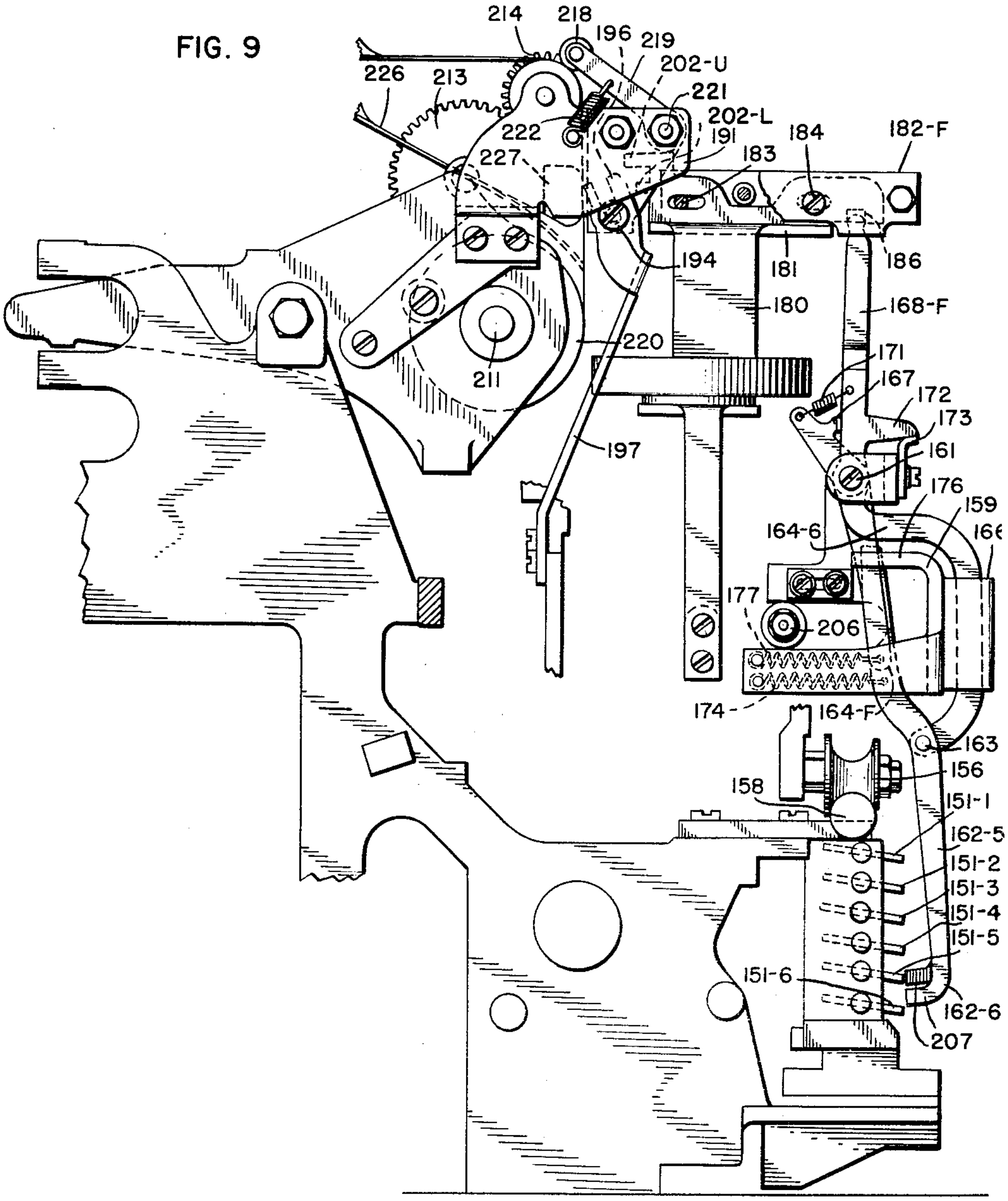
Fig. 9 is a partial end view of the same printer.

On each forward movement of the printing bail in each cycle of operation an extension 206 extending therefrom, is designed to engage the tail end of lever 164—F causing it to pivot in a counterclockwise direction as viewed in Fig. 9 and by means of its spring 171 to carry its associated vertically extending lever 168—F to its rearmost position. As lever 168—F moves rearwardly it carries its associated slide 182—F also to the rear which by means of projection 202U or 202L depending on the case position of the apparatus, universally operates the code feed marking lever 198—F in each printing operation. Further, as extension 206 of the printing bail moves forwardly, it engages the upper edge of levers 162—1 to 162—6 and causes these levers to pivot harmlessly in a clockwise direction as viewed in Fig. 9, if their projections 207 do not bump against an associated vane 151—1 to 151—6. However, if the projections 207 of levers 162—1 to 162—6 bump against the printer vanes 151—1 to 151—6 as when they have assumed their marking or clockwise positions, the vanes will serve as a fulcrum point and cause bail extension 206 to carry selected levers 164—1 to 164—6 in an outward or counterclockwise direction as viewed in Fig. 9 and through their springs 171 to pivot associated levers 168—1 to 168—6 in a counterclockwise direction. In this manner, selector levers 182—1 to 182—6 will move towards the rear of the machine slightly and engage either their projections 202U or 202L, according to the case shift position of the apparatus, with associated code mark levers 198—1 to 198—6. It will be understood that feed mark lever 198—F will always be operated during a printing operation. As described in the aforementioned Morton et al. patent, during certain function operations, printing bail extension 206 will not move a full stroke, and therefore, the carriage will not space and no code or feed marks will be printed under such conditions. However, when a space signal is received, that is, a letter space signal, bail 206 will make a full stroke and cause operation of code mark lever 198—3 and at the same time feed mark lever 198—F. But at this time, no corresponding printed character is printed, since no character is provided in the printer for this operation. It is desired that the sixth code mark be printed when sixth vane 151—6 is in its counterclockwise or figures shift position and, therefore, in this case, projection 207 of lever 162—6 will engage against vane 151—6 only in this position. The projections 207 of the other levers 162—1 to 162—5, however, engage against vanes 151—1 when the latter are in their clockwise or marking positions. No sixth code mark will be printed with vane 151—6 in its clockwise or letters shift position.

Attached to the platen shaft 211 is a gear 212 which is in mesh with a gear 213 which in turn drives the gear 214. Gear 214 is mounted on shaft 216 which carries an additional paper feeding roll 217. Auxiliary paper feeding roll 217 is engaged by a pressure paper roll 218 carried by lever 219 which is urged about the pivot 221 by means of a spring 222. For accomplishing code mark printing impressions, a sheet of carbon paper 226 is suitably fed around the lower end of a platen 227, with its inking face adjacent to the rear of the topmost page form when multiple copying is being performed, and is fed together with the top copy between the pressure roller 218 and the auxiliary paper feed roll 217. Additional printed copies may be fed out over the platen 220 in the usual manner. It is now apparent that each time a character is printed by operation of a type bar (not shown) against the platen 220, corresponding code marks will be made in a vertical line above the character and at the rear of the page form. in addition to the usual feed marks. It is to be noted that the feed marks lever 198—F, is interposed between code mark levers 198—3 and 198—4. Although printing is suppressed during shift and unshift functions in both types of page printers described above, it should be remembered that the first code mark combination following the shift operation will show the presence or absence of the sixth code mark according to the case position assumed by the printer.

Referring now particulary to Figs. 12 to 19, the photoelectric transmitting apparatus provided in the present invention will be described. A pictorial representation of a portion of the rear of a page form 240 to be scanned by the photoelectric transmitter is shown in Fig. 17 with the code marks appearing thereon corresponding to related characters appearing on the front of the page form. Numeral 250 represents the base of the apparatus upon which is mounted a motor 251 for providing rotary movement of main shaft 252 by means of gears 253 and 254. Shaft 252 is journaled on the upright supports 256 and 257 and has fixedly attached thereto a scanning disc 258, shown in detail in Fig. 16.

Extending across the top of the apparatus is a cross support 259 into which is threaded a downwardly extending pivot stud 261. Supported about pivot stud 261 is a ball bearing 262 incased in a member 263 which is rigidly secured to the oscillating projector generally indicated as numeral 264. Projector 264 includes two separate lens carrying elements 266 and 267, each movable in the cylindrical or tube portion 268 of the projector. Upon oscillation of the projector, as will later be described, sliding movement of lens element 266 is produced by reason of the engagement of a pin 269 carried thereby in a slot 271 of a cross piece 272. Sliding movement of lens element 267 is similarly produced by engagement of pin 273 in slot 274 of crosspiece 276. It is to be understood that the tube portion 268 of the projector, at the places where engaged by pins 269, 273, will be provided with suitable clearances to permit the sliding movement of elements 266 and 267. Because of the construction just described above, the focal length of the projector 264 may be varied according to the area of the page form 240 being scanned as will later become more apparent.

One end of the projector 264 is covered by a plate 277 having openings 278—1 to 278—6, 278—F (Fig. 18) and an opening 278—S which are adjacent to the scanning disc 258. The openings just mentioned are made narrower than the image received therethrough so that when a code mark or a feed mark is scanned it will completely cover the opening to which it is related. This further allows a slight misalignment between the projector 264 and the code marks of page form 240.

At the top of the apparatus is a guideway 279 composed of a guiding plate 281 and the top plate 282 of the apparatus. Plate 281 is of transparent material to allow viewing of the printed characters on the page form. Plate 282 is slotted at 283 so as to expose one line of code marks to a suitably mounted mirror 284. Light for the optical system is provided by a fluorescent lamp 286 extending across the apparatus at the top of the mirror 284. Mounted between plate 277 of projector 264 and scanning disc 258 is a thin opaque shutter 287 shown in detail in Fig. 19 which is mounted on an armature 288 of a magnet 289. Shutter 287 is movable to two different positions as will later appear. In one position it will permit the passage of light for scanning purposes through feed hole opening 280—F formed thereon, from opening 278—F of plate 277 and at this time block all of the openings 278—1 to 278—6 and 278—S. In the other position, projection 292 of shutter 287 is interposed in front of feed hole opening 278—S and all the code mark openings are unblocked for scanning purposes.

With reference now to Fig. 16, the scanning disc 258 will be described in more detail. Its purpose is to selectively control the passage of light to a photoamplifier tube 293 suitably mounted in the apparatus. Scanning disc 258 consists of an opaque circular plate having arcuate transparent areas 294—1 to 294—6, progressively arranged about the center point at different radial positions which are in line with corresponding openings in plate 277 of projector 264. In addition, an arcuate transparent area 294—S is provided for the start impulse while a continuous transparent ring 294—F is provided for scanning of the feed mark. The start impulse is provided by painting a line the same color as the page form across the underneath part of plate 282 adjacent the slot 283. No arcuate transparent area is provided for the stop impulse since this corresponds to a marking impulse and at this time an opaque portion of disc 258 which lies between areas 294—6 and 294—S will be presented in scanning position with respect to photoamplifier tube 293.

The mechanism for moving the free end of the projector 264 back and forth across the apparatus for scanning purposes will now be explained. Fast to main shaft 252 is a gear 301 which is in mesh with a gear 302 carried by a second shaft 303. The latter shaft has fixed thereto a gear 304 in mesh with a gear 306 rotatably mounted about shaft 252 on sleeve 316. Friction washers 308, 309 operable by arms 311 and 312 of armature 313 of magnet 314 act as a clutch to enable the rotation of a gear 307 with the gear 306. The previously described gearing provides a speed reduction for gear 307. Gear 307 is in mesh with a rack 317 which is suitably connected to projector 264 by means of a pin 318. Thus, when clutch magnet 314 is periodically energized, gear 307 will drive the rack 317 to the left as viewed in Fig. 14, causing the projector 264 to move also periodically to the left to scan a line of code marks as will hereafter appear. Rack 317 is provided with rollers 320 which ride in the slotted guideway 325. For returning the projector 264 to the beginning of line position, a gear 319 is provided which is also in mesh with the rack 317 and is carried rotatably about the shaft 303 on a sleeve 321. When gear 307 drives rack 317, gear 319 moves idly about the shaft 303 in a counterclockwise direction. Return movement of gear 319 is under the control of a single revolution clutch indicated generally at 322 the operation of which is governed by a clutch magnet 323 in a manner well known in the art. Stop arm 324 is operable under the control of armature 326 of clutch magnet 323 as will be later described in detail. When the clutch 322 is released sleeve 326 rotates until a lug 327 carried thereby engages a lug 328 carried by the gear 319. When this occurs, gear 319 will rotate in a clockwise direction and drive rack 317 back to its beginning of line position. The length of the previous line scanned determines at what point lug 327 will engage lug 328. It is apparent that when gear 307 drives the rack 317, gear 319 will also be rotated and lug 328 will move away from lug 327.

Suitably pivoted at 329 in the apparatus is a brake 331, urged in a counterclockwise direction (Fig. 12) by means of a spring 332, and carrying brake material 333 which presses against the side of rack 317 through the opening in guideway 325. Arm 312 of armature 313 has an extension 334 which operates against one end of a lever 336 pivoted at 337, causing a projection 338 carried at its other end to operate against brake 331 and free it from rack 317 when clutch magnet 314 is energized. At this time gear 319 may drive rack 317 to the left as shown in Fig. 14. When the projector unit is being returned to the beginning of line position, clutch magnet 323 will operate and sleeve 326 will be released for rotation as explained. Sleeve 326 carries a cam 339 which operates a follower slide lever 341, which by pushing against the shorter arm of brake 331, also frees the brake so that gear 319 may be permitted to drive rack 317 to the beginning of the line position. Just before this position is reached cam 339 operates lever 341 and permits brake 331 to move to its braking position preventing the optical unit from being jarred or rebounding. It is apparent then, as rack 317 is operated, projector 264 will be pivoted and lens sections 266, 267 will slide in the tube 268 to automatically adjust the focal length of the projector according to the area of the page form being scanned.

A description of the page form feeding mechanism will now be given. On shaft 252 is rigidly attached a gear 342 which is in mesh with a gear 343 carried on a shaft 344 journaled on supports 346 and 347. At one end, shaft 344 has secured thereto a small gear 348 which is in mesh with a large gear 349 mounted on a shaft 351. Shaft 351 is mounted in bearings 352 and 353 and supports the paper feed roll 354 which is constantly rotated through the just described gearing arrangement. Mounted for vertical sliding movement at either side of the apparatus on brackets 356 and 357 are members 358 and 359 which support at their upper ends a pressure roller shaft 361 extending therebetween. Shaft 361 supports the pressure roller 362. The lower ends of members 358 and 359 are connected by a cross rod 363 the middle portion of which has attached thereto an armature 364 which is under the control of a magnet 366. Compression springs 367 normally urge members 358 and 359 to an upward position so that pressure roller 362 is free of constantly rotating feed roll 354 and no feeding of the page form takes place. At this time a brake member 368 also supported from members 358 and 359 and having brake material 669 holds the paper from movement against the upper guideway 281 as is shown clearly in Fig. 13. However, when armature 364 is attracted upon energization of magnet 366 members 358 and 359 are pulled down against the tension of springs 367, freeing brake member 368 from the page form and enabling pressure rollers 362 to force the page form 240 against feed roll 354. At this time the page form is fed forward as will more readily hereinafter appear in connection with the description of the circuit arrangements.

Before a description of the first circuit arrangement is undertaken, attention is called to switch cams 369, 370, and 371 mounted on the constantly rotating shaft 252 of the transmitting apparatus and to contact bank 548 at the right side of Fig. 14. It is to be understood as has been pointed out before, that the apparatus is adapted to be used either for transmission of a six unit code or with some modifications for an arrangement wherein six unit code signals are converted into five unit code signals with automatically inserted shift signals.

The circuit arrangement for transmitting six unit code signals will now be described with particular reference to Fig. 20. Numeral 375 represents an alternating current power source which furnishes power for the motor 251 and for the primary 376 of a transformer 377. Power for the illumination of the previously identified fluorescent lamp 286 is provided from secondary 378 of transformer 377 by means of rectifier filter 380. The other secondary 379, by means of rectifiers 381, inductances, 382, and condensers 383, furnish current for operation of photoamplifier tube 293 and the primary of a transformer 384. The secondary 379 of transformer 377 is tapped at its midpoint and grounded. The elements of photoamplifier tube 293 are connected to taps of a resistance 386 to provide varying potentials with the most positive potential applied to the element adjacent collector plate 387. As the code marks are scanned and light is impinged on the photoamplifier tube 293, if unprinted areas are scanned, there is a substantially uniform current in the primary of transformer 384. If all areas scanned in succession have printed code marks, again a substantially uniform current flows in the primary of transformer 384 but in this case it is of a lower value. Under either of the above steady state conditions just outlined above, no current will flow in the secondary of transformer 384. The secondary of transformer 384 is connected to the grid of tube 388, the plate of which is in series with the primary of a transformer 389. The secondary of transformer 389 is grounded at its midpoint and is associated with rectifiers 391, 392, which respectively may pass positive impulses to the grids of tubes 393, 394. The plate circuit of tube 393 is connected to positive potential through resistance 396 and one winding of commutating transformer 397, while the plate circuit of tube 394 is connected to positive potential through resistance 398 and the other winding of transformer 397. Tubes 393, 394, are gas discharge tubes and are designed to remain in the condition last assumed.

If a printed area is being scanned and during the next impulse interval an unprinted area is scanned, the value of the current flowing in the primary of transformer 384 suddenly changes inducing a voltage in the secondary of transformer 384, which is then amplified by tube 386, the amplified output of which is applied through transformer 389 to rectifiers 391 and 392 in series with grid load resistor 395. Grids of tubes 393 and 394 are normally biased negatively by means of positive battery applied through tapped resistor 399 to the cathodes, precluding tubes 393 and 394 from firing prior to a signal impulse being received from the photoelectric source.

Positive voltage impulses appearing across the secondary of transformer 389 are passed by rectifiers 391 and 392, raising the grid potential of tubes 393 or 394 to a value approximately equal to the existing positive cathode ground potential, causing the respective tube to ionize. A subsequent positive impulse on a grid of the opposite tube causes it to ionize or fire and extinguish the previously ionized tube.

It will be assumed that when passing from printed areas to unprinted areas that rectifier 392 passes current and then tube 394 will be fired. When this occurs the current set up in its associated winding sets up a current in the winding associated with tube 393 which extinguishes the latter tube. On the other hand, when passing from unprinted to printed areas, rectifier 391 passes positive potential and allows tube 393 to fire and the action of transformer 397 is to now extinguish tube 394. When printed areas are scanned, transmitter relay 401 energizes and when unprinted areas are scanned, relay 401 is de-energized. Thus, relay 401 will remain in its last operated position in accordance with the firing of gas discharge tubes 393, 394, in response to the scanning of successively opposite conditions of the page form.

As previously mentioned, cams 369, 370, and 371 are mounted on the main shaft 252 which also carries the scanning disc 258. The relationship of these cams to the scanning disc 258 is clearly shown in Fig. 16 wherein it is observable that cam 369 has a high portion which extends the whole length of the stop impulse, the high portion of cam 370 is only half as long as cam 369 and cam 371 has a small high portion which operates near the end of the stop impulse.

It will now be assumed that the transmitter is operating and relay 401 is accordingly transmitting signals over a line 402 to a distant station 403. A further assumption will be made that shaft 252 has now reached the position shown in Fig. 20. A circuit may now be traced as follows: From battery, through the winding of shutter magnet 289, over conductor 404 and through contact tongue 400 (now closed) of cam 369 to ground. With shutter magnet 289 energized, shutter 287 moves to a position to block scanning of the code marks just transmitted, unblocking the feed mark related to said last transmitted code marks. At this time, a circuit is also traceable as follows: From battery, through the winding of clutch magnet 314, through contact pair 408 (now closed), over lead 409, through tongue 411 (now on its back contact) of double wound relay 412, over leads 413, 446, through closed contact tongue 414 operable from cam 370, and through the contact tongue 416 of a polar relay 417 to ground. Contact tongue 416 is now on its left contact as will be later described. Magnet 314 is thus energized at this time and the projector 264 is accordingly advanced as was previously described in connection with the mechanical part of the invention and moves towards the next feed mark. After contact tongue 414 of cam 370 opens, the projector will have moved off the feed mark accompanying the code marks just scanned and will be scanning an unprinted area between feed marks, and relay 401 will be de-energized and relay 405 will be energized over an obvious circuit as contact tongue 418 of relay 401 falls to its back contact. The circuit for clutch magnet 314 now extends as follows: From ground, through contact tongue 421 of relay 405, over lead 422, through contact tongue 423 (still closed) of cam 369 and over lead 424 to the circuit previously described extending from lead 413 to clutch magnet 314.

As clutch magnet 314 remains energized, projector 264 continues to advance as pointed out above until the next feed mark is encountered, it being remembered that shutter 287 is at this time in its feed mark scanning position. When such a feed mark is encountered transmitter relay 401 will operate and contact tongue 418 will be drawn up to break the circuit to relay 405. Opening of contact tongue 421 of relay 405 breaks the previously described circuit for clutch magnet 314 extending through tongue 421 and the projector 264 comes to rest.

When contact tongue 431 is closed by cam 371 the projector should have reached the next feed mark, if the spacing between feed marks is normal. Under this assumed condition transmitting relay 401 will energize and relay 405 will de-energize moving its tongue 419 to its back contact as previously described and completing a circuit as follows: From ground, over lead 432, through the left winding of polar relay 417, over lead 433, and through contact tongue 431, and contact tongue 430 of cam 435 carried by carriage return sleeve 326 to battery. Under this condition contact tongue 416 will remain in the same position against the left-hand contact. What happens when abnormal spacing occurs will be explained later.

When contact 400 is opened by cam 369 to open the circuit for shutter magnet 289, the shutter 287 moves to its code mark scanning position to allow scanning disc 258 to scan the code marks of the signal code combination accompanying the feed mark which caused the advancement of projector 264 to be halted. However, the painted line previously identified as being painted beneath plate 282, adjacent slot 283 of the apparatus is scanned to first send the start or no current impulse, causing contact tongue 418 of relay 401 to move to its spacing position. During the stop impulse period, line 402 is maintained closed by a shunting circuit extending over lead 434, through contact 436 of cam 369 and over lead 437 to battery lead 438. Thus, regardless of the operation of relay 401 during the stop impulse period, line 402 is left closed. After the start impulse is transmitted the arcuate transparent areas 294—1 to 294—6 of disc 258 sequentially sweep past related openings 278—1 to 278—6 of plate 277 of the projector to sequentially scan the printed code marks and operate photo-amplifier tube 293 and transmitting relay 401 accordingly. When the stop impulse position of scanning disc 258 is reached the cycle of operation described above is repeated. It will be understood that although printed characters are not printed in response to the letter space signal by the page printers described earlier in the specification, that corresponding code marks are printed with the usual feed marks for photoelectric transmission purposes.

It will now be assumed that two characters are abnormally spaced due to some defective operation. The operation in the beginning of a cycle with shaft 252 in the position shown in Fig. 20 is exactly the same. However, when contact 431 is closed, relay 405 will be energized since the projector 264 has not yet reached the next feed mark and is scanning a white area of the page form. When this occurs ground extending from contact tongue 419 of relay 405 completes a circuit over lead 441 through the right-hand winding of polar relay 417 and over lead 433 through contact 431 of cam 371 and through contact 430 of cam 435 to battery. As a result, contact tongue 416 moves against its right contact and remains in this position for an entire cycle or until contact 431 is again closed by the high portion of cam 371 after the next feed mark is reached as will be explained below. An obvious circuit is now made extending over lead 426 for relay 407. When relay 407 is energized, it pulls up its tongue 442 and places a steady marking current on line 402 over the lead 443 for a complete cycle of operations and no code signal will be transmitted during this interval. The scanning disc 258 will make its usual rotation but at this time contact tongue 406 of relay 407 will be closed to maintain shutter magnet 289 operated over lead 404. Shutter 287 thus remains in its feed mark scanning position and does not permit scanning of the code marks.

During this time, the projector continues to advance towards the next feed mark since clutch magnet 314 is now held energized over a circuit extending from ground at contact tongue 421 of relay 405 (now energized), over lead 422, through contact tongue 444 (now closed) of relay 407, over lead 446 to the previously described circuit extending over lead 413 to clutch magnet 314. However, when the next printed feed mark is scanned, relay 401 will be energized and relay 405 will be de-energized, opening contact tongue 421 and breaking the just described circuit for clutch magnet 314 bringing the projector to rest.

While shaft 252 continues to rotate after cam 371 has closed contact tongue 431, as previously described, projector 264 proceeds toward the abnormally spaced feed mark. Usually, it will find this feed mark before shaft 251 has completed another revolution and will cause clutch magnet 314 to de-energize and stop projector 264 as described above. When cam 370 closes contact 414 the original operating circuit for clutch magnet 314 cannot be completed since contact tongue 416 of polar relay 417 is still on its right-hand contact and the projector will be held at rest to scan the code combination delayed in the previous cycle. Now when contact 431 is closed immediately after, tongue 419 of relay 405 is on its back contact since the next feed mark is now being scanned and relay 401 is energized and relay 405 is de-energized. Therefore, a circuit will be completed to the left-hand winding of polar relay 417, causing the de-energization of relay 407 as contact tongue 416 moves to the left. Tongue 406 of the latter relay falls away opening the circuit of shutter magnet 289, permitting the code marks to be scanned and contact tongue 442 of the same relay falls away taking the battery off lead 443, permitting relay 401 to send the start impulse over line 402. The signal delayed by the abnormal spacing is now transmitted and normal operation continues until abnormal spacing is again encountered. On the following cycle, clutch magnet 314 may again be energized since contact tongue 416 of polar relay 417 is again on its left contact and the projector 264 may move to the next feed mark as described to scan its accompanying code marks.

Operation of the end of line mechanism for returning the projector 264 to its beginning of line position will now be explained. As the projector 264 continues to advance after scanning the last set of code marks of the line, it will scan a relatively long unprinted area. It should be mentioned at this time that when relay 407 is operated when an abnormal white feed mark area is scanned, it will send a pulse to a slow-to-operate relay 451. If the unprinted area produces a pulse long enough to operate relay 405 for more than one cycle, a tongue 418 of transmitting relay 401 moves against its back contact, relay 407 will stay operated for at least two complete cycles. At this time relay 407 will pull up its tongue 442 and maintain a marking condition on line 402 as before. Furthermore, it should be mentioned that closure of tongue 406 by the same relay maintains a circuit for shutter magnet 289. Relay 407 will now stay energized long enough to enable its contact tongue 455 to operate slow-to-operate relay 451.

When slow-to-operate relay 451 is operated, a circuit is made through its contact tongue 452 and over lead 453 for the clutch magnet 323, which it will be recalled controls the operation of the carriage return mechanism. Armature 324 of clutch magnet 323 now pivots counterclockwise as viewed in Fig. 14 and carries with it latch 454 which is pivoted at 456 on armature 326 and urged clockwise by a spring 457. Nose 458 of latch 454 now engages the lower end of clutch stop arm 324 causing it to be pivoted about the points 459 in a clockwise direction against the influence of spring 461. This frees the clutch 322 for operation and gear 319 functions to drive the projector to its beginning of line position. Near the end of the movement of armature 326, latch 454 engages a fixed pin 462 which results in pivoting latch 454 counterclockwise freeing its nose 458 from the lower end of stop arm 324 and allowing the stop arm to return to its stopping position and insuring that the clutch 322 will make only a single revolution. When clutch magnet 323 is de-energized armature 326 is operated clockwise about its pivot 463 by operation of a relatively strong spring 464. At this time nose 458 will snap past the lower end of stop arm 324 and move to its original position. It is apparent then, that even though magnet 323 may remain energized, clutch 322 will permit only a single revolution of sleeve 321.

When the projector 264 reaches the beginning of line position roller 320 at the right (Fig. 14) which moves in slotted guideway 325 will operate contact bank 548 and tongue 467 associated therewith which has been in a position to enable condenser 468 to become charged. Condenser 468 now discharges through the left-hand winding of double wound relay 412, over lead 469 when contact 471 is closed by cam 370. Relay 451 is so adjusted that it operates a predetermined time after relay 407 and thus the projector will start its return movement at a fixed time. Further, the gearing will be such that projector 264 reaches the beginning of the line after shaft 252 has made a predetermined number of revolutions. As a result, contact tongue 467 is operated with shaft 252 in a predetermined angular position. Preferably, the timing is such that contact tongue 467 will move against left-hand contact just prior to the time that contact tongue 414 is closed by the high part of cam 370. When contact tongue 471 of cam 370 closes, the circuit for double wound relay 412 is made as already described. Relay 412 will now lock up through its contact tongue 472, over lead 473, and through contact tongue 474 of cam 370. When the beginning of the line was reached the margin feed mark appearing in the margin at the right of that line is scanned at this time and relay 405 will be de-energized. However, when the projector scans a white or blank area as will appear hereafter, contact tongue 419 of relay 405 will be drawn up and complete a locking circuit over lead 473 for relay 412. While the projector 264 is returning to its beginning of line position, carriage return sleeve 326 by means of U-shaped lever 440 which is provided with pins 445 resting in collar 460, opens contact pair 408 to prevent operation of clutch magnet 314 during this period.

When relay 412 is operated, a circuit is made through line feed magnet 366, over lead 477, through contact tongue 411 of relay 412 (now on its front contact), over lead 413, through closed contact 414 of cam 370, and over lead 478 to contact tongue 479 now drawn up by slow-to-operate relay 451. When the page form is fed, the projector will scan a white area existing between the outermost or margin feed mark of the line of code marks just scanned and the outermost or margin feed mark of the new line of code marks. It is at this time the locking circuit is maintained for relay 412 from contact tongue 419 of relay 405 as mentioned above. Contact tongue 406 of relay 407 is, therefore, maintaining shutter magnet 289 energized and contact tongue 442 of the same relay is maintaining a marking condition of line 402. It should be noted that when the projector is returning to its beginning of line position, carriage return sleeve 326 rotates to open contact 430 by means of cam 435 so that regardless of the operation of relay 401, the windings of polar relay 417 cannot be pulsed and tongue 416 will remain on its right contact. Just before the carriage reaches its beginning of line position, contact 430 will close but meanwhile the high portion of cam 371 will have already operated contact 431 and operation of tongue 431 during the carriage return interval is thus ineffectual since contact 430 is open.

While the projector 264 is scanning the white area between the margin feed marks, transmitting relay 401 will be de-energized as already indicated and relay 405 will operate and pull up its contact tongue 421. This now provides a locking circuit for line feed magnet 366 which extends through contact tongue 421 of relay 405, contact tongue 444 of relay 407, and over lead 446 to lead 413, which completes the circuit to magnet 366 as before. Now even though contact 414 is opened by cam 370 to break the original circuit for line feed magnet 366, it will still remain energized. When the outermost or margin feed mark of the new line of code marks is scanned, relay 401 will operate and break the just described circuit to magnet 366 to stop the feeding of the page form in its proper scanning position. It is to be understood that the line feeding operation is completed before shaft 252 completes a single revolution. It is possible to have multiple line feeding operations as long as the line feeding operations are completed with shaft 252 in a predetermined angular position.

It should be further observed, that when the new feed mark is scanned contact tongue 419 of relay 405 opens the locking circuit for relay 412 since at this time relay 401 energizes and relay 405 de-energizes. A circuit may now be traced from battery, through clutch magnet 314, through contact pair 408, over lead 409, through tongue 411 (now on its back contact) of relay 412, over lead 413, through contact tongue 414 of cam 370 and over lead 478 to grounded contact tongue 479 of slow-to-operate relay 451. Clutch magnet 314 is therefore energized and projector 264 now starts its travel to scan the new line of code marks and after it moves a slight distance off the margin feed mark roller 320 (Fig. 14) it returns contact tongue 467 to its original position where it provides a charging path for condenser 468 for its next operation. Since contact tongue 416 of polar relay is still remaining on its right-hand contact, a locking circuit will still be made over lead 426 for relay 407. Thus the projector 264 continues to advance to the feed mark accompanying the first code mark combination of the new line. However, when contact 431 is now operated by cam 371 with contact 430 closed by cam 435, contact tongue 416 of polar relay 417 will move against its left-hand contact, as the left-hand winding of polar relay 417 receives a pulse because contact tongue 419 of relay 405 is on its back contact since transmitting relay 401 is at this time energized. Thus relay 407 and slow-to-operate relay 451 will be unoperated and the circuit will be returned to normal scanning condition. It will be understood that contact 431 will be operated just after the feed mark is reached, assuming, of course, a normal spacing condition. Clutch magnet 314 is now halted in its code mark scanning position since a circuit is no longer completed through contact tongue 479 of relay 451. Further, since it is assumed that normal spacing exists between characters, relay 405 is de-energized and the abnormal spacing circuit described earlier in the specification as extending through contact tongue 421 of relay 405 and tongue 444 of relay 407 over lead 446 to lead 413, cannot be completed.

A résumé of the operation will now be given. When normal spacing exists between feed marks, after the transmission of a set of code marks has been made, clutch magnet 314 is energized and the projector 264 moves towards the next feed mark and its accompanying set of code marks with the shutter 287 in feed mark scanning position. When the next feed mark is reached, the projector 264 halts to scan its accompanying code marks with the shutter 287 in its code mark scanning position. If abnormal spacing occurs, relay 407 operates, the stop impulse to the line is prolonged and the shutter 287 is held in its feed mark scanning position, while the projector 264 continues to move toward the next feed mark and its accompanying code marks. When the next feed mark is reached the projector is halted and the code mark combination is transmitted after contact tongue 431 closes to operate the left-hand winding of polar relay 417 and thus release relay 407. When the end of the line is reached, prolonged scanning of an unmarked or white area causes relay 407 to operate slow-to-operate relay 451. Operation of relay 451 provides a circuit for energization of carriage return clutch magnet 323 which returns projector 264 to its beginning of line position. Double wound relay 412 is now operated and a circuit is completed for the line feed magnet 366 which energizes and thereby enables a new line of the page form to be scanned. The projector 264 now proceeds from the margin feed mark of the new line of code marks to the feed mark accompanying the first set of code marks to be transmitted. At this time, contact 430 operable by cam 435 of carriage return sleeve 326 will have been closed and the left-hand winding of polar relay 417 is pulsed, opening the circuit for relay 407 and returning the transmitter to normal scanning condition.

With particular reference to Fig. 16—A to Fig. 19—A, which correspond to similarly numbered figures of the six unit transmitter, and to Fig. 21, a description will now be given of a five unit code transmitter which automatically inserts shift signals. It will be understood that the same transmitting apparatus, with minor changes, will be used in this case as was used in connection with the six unit transmitter.

When the five unit transmitter is to be used, a scanning disc 253—A (Fig. 16A) is provided on shaft 252 in place of disc 253 (Fig. 16). It will be noted that disc 253—A includes a smaller transparent arcuate area 294—5 which represents the shift on sixth code element of a code combination and occupies approximately one-half of the start impulse area. There is no transparent area for the start or stop impulses, since such impulses are transmitted by cam operated contacts to be later identified. It will be further noted (Fig. 16A) that additional cams, mounted on shaft 252 are utilized in the transmitter now being described and will be hereinafter identified. It will be further observed that shutter 287—A is different from shutter 287, in that an additional aperture 501 and a projection 502 are provided for control of the shift or sixth code element of the code marks.

Reference should now be had to Fig. 21 of the drawings for the circuit arrangement of the five unit transmitter. Where parts are substantially the same as parts appearing in Fig. 20, similar numerals will be used and the description will be repeated only where necessary for a full understanding of the invention. Leads 404, 453, 409, and 477 represent similarly numbered leads extending approximately from the middle portion of the circuit appearing in Fig. 20 on the line A—A. Transmitting relay 401 is operated as before according to the scanning of the printed feed and code marks.

It will now be assumed that the five unit transmitter is in operation and that normally spaced characters in a line are being scanned. It will be further assumed that shaft 252 is in the position shown in Fig. 21. In this position a circuit for the shutter magnet 289 now extends from ground, through contact 503 of cam 504 and over lead 404 to the shutter magnet 289. At this time, therefore, shutter 287—A is in its feed mark scanning position. Projector magnet 314 is energized at this time, causing the projector 264 to advance towards the next feed mark over the following circuit: From lead 409 which extends to projector magnet 314, through contact 411, now on its back contact, over lead 554, through contact tongue 553 of relay 517, through contact tongue 552 of relay 519, over lead 510, through contact 414 when closed by cam 370, over leads 506, 507 to grounded contact tongue 416 of polar relay 417 now on its left contact. After contact 414 of cam 370 is opened the circuit for magnet 314 now extends as follows: From lead 409, through tongue 411 of relay 412 as before, over leads 508, 509, through contact tongue 423, and over lead 422 to contact tongue 421 of relay 405 to ground. It should be remembered that the projector is now scanning a white area between feed marks and that relay 401 is de-energized while relay 405 is energized. When the next feed mark is reached relay 405 will de-energize and its contact tongue will fall away to break the circuit for clutch magnet 314, thereby stopping the projector. Contact tongue 503 of cam 504 will now be opened and the circuit to shutter magnet 289 will be broken to permit scanning of the new set of code marks.

In each cycle of operation, a marking or stop impulse is transmitted as follows: From battery, over leads 511, 512, through tongue 513 of cam 369, over lead 514, through make-before-break contacts 516 of double wound relay 517, through make-before-break contacts 518 of double wound relay 519, through make-before-break contacts 521 of relay 522, and over lead 523 to line 402 extending to the distant station 403. During the start impulse period contact 513 of cam 369 opens insuring that the circuit just described will be opened. Furthermore, during the start interval, contact 524 of cam 526 will open, so that independently of the condition of relay 401, the start impulse will be transmitted except when abnormal spacing occurs or during end of line operations as will hereafter appear. After the sending of the start impulse scanning disc 253—A scans the five code marks and accordingly relay 401 is operated and signals are sent over the line 402. Automatic insertion of shift signals will be explained later.

At some point near the end of the stop impulse period, cam 371 will close contact 431 and send a pulse through either the left-hand or right-hand winding of polar relay 417 as described earlier in the specification in connection with the six unit code transmitter. If for some reason abnormal spacing between characters occurs, the right-hand winding of polar relay 417 receives a pulse through contact 431 and tongue 416 of relay 417 moves to its rightward position to close an obvious circuit extending over lead 446 to relay 407. When relay 407 operates steady marking current is placed on the line by a circuit extending from lead 511, over tongue 442 (now closed) of relay 407 and over lead 531 to lead 514 which extends to line 402 as previously described. Furthermore, at this time contact tongue 406 of relay 407 will be drawn up completing a circuit over lead 404 for shutter magnet 289 which holds shutter 287—A in its feed mark scanning position. The projector continues to advance to the next feed mark as magnet 314 is energized over a circuit extending from contact tongue 421 of relay 405 (now energized since a white area is being scanned) over lead 422, through tongue 444 (now closed) of relay 407, over leads 509, 508, and through tongue 411 of relay 412 to lead 409 as before. As soon as a black feed mark is scanned, relay 401 will energize and relay 405 will de-energize and tongue 421 of the latter relay will break the circuit just described and stop the projector 264. Now when contact 431 of cam 371 closes, the left winding of polar relay 417 will be pulsed and the circuit of relay 407 will be broken. The line will now be freed for code mark scanning purposes and the shutter will move to its code mark scanning position. It will be noted that while the next feed mark is reached in the previous cycle that during this period the line is kept closed and the signal which had been delayed by abnormal spacing is now transmitted.

It will now be assumed that there is a prolonged scanning of a white area at the end of a line as was previously described in connection with the six unit code transmission. Relays 405 and 407 are energized at this time and when make-before-break contact 532 is operated momentarily by cam 533, a circuit may now be traced from contact tongue 421 of relay 405, through contact tongue 536 of relay 407, over lead 537, through contact 538, the operation of which will be explained later, over lead 539, and through contact 532 of cam 533 to the winding of relay 522. Relay 522, now locks up, as make-before-break contact 532 again closes, through its locking contact tongue 541. As contact tongue 542 is operated by relay 522, a circuit may be traced over lead 453 to carriage return magnet 323 and the projector is returned to its beginning of line position as described previously. When make-before-break contact tongue 521 is operated by relay 522, a carriage return transmitting contact 543 operable by a suitably notched cam 544 is placed in circuit with line 402 in a circuit extending from battery 546, through contact 543 (when closed), over lead 547, through make-before-break contact 521 now held in its operated position by relay 522 to lead 523 which extends to line 402. Thus, at this time a carriage return signal is automatically sent to distant station 403 during the first revolution of shaft 252 when the projector returns to its beginning of line position.

When the projector 264 reaches its beginning of line position, contact bank 548 is operated by a roller 320, carried by rack 317 (Fig. 14) of the transmitting apparatus, thereby moving contact bank 548 to the left. As contact 467 is moved to the left, condenser 468 discharges through the left winding of double wound relay 412 over lead 469, when the high portion of cam 370 closes contact 471. Another circuit may be established for the locking or right-hand winding of relay 412, when the margin feed mark of the line of code marks just transmitted is scanned since the projector has returned to its beginning of line position as follows: From battery, through the right-hand winding of relay 412, through contact tongue 472, over leads 473, 566, through contact tongue 419 (now against its front contact) to ground. Line feed magnet 366 is now energized over a circuit extending from lead 477, through contact tongue 411 (now on its front contact) of relay 412, through contact 414 of cam 370, over leads 506, 507 to contact tongue 567 (now closed) of bank 548.

During the line feed operation a white area will be scanned between the margin feed mark of the line just scanned and the margin feed mark of the next line to be scanned as the page form is fed upwardly. The locking circuit for relay 412 will now be made as follows: From battery, through the right-hand winding of relay 412, through its contact tongue 472, over leads 473, 551, and through contact tongue 474 when closed by cam 370 to ground. When the white area mentioned above was scanned, a new circuit for line feed magnet 366 is established which extends over lead 477, through contact tongue 411 as before, over leads 508, 509, through tongue 444 of relay 407 and over lead 422 to grounded contact tongue 421 of relay 405.

When the new margin feed mark is reached, relay 405 is released causing relay 412 to deenergize and the circuit for the line feeding operation just described is broken and the feeding of the page form ceases. The projector 264 is now ready to scan the new line of code marks. With the relay 412 de-energized and relay 405 released, a circuit for the magnet 314 is now established when contact 414 of cam 370 is closed as follows: From lead 409, through tongue 411 (not on its back contact) through contact 414, when closed by cam 370, over leads 506, 507 to grounded contact tongue 567 of bank 548. With magnet 314 energized the projector 264 now moves towards the next feed mark. After it moves a slight distance onto the white area between adjacent feed marks of the new line, contact bank 548 will be opened as roller 320 (Fig. 14) moves away and contact tongue 567 will open the just described circuit for magnet 314. However, even though opening of tongue 567 breaks the circuit for magnet 314 as described above, a circuit at this time may be traced through contact tongue 411, over leads 508, 509, through contact tongue 444 of slow-to-operate relay 407, still operated since tongue 416 of polar relay 417 is against its right contact, and over lead 422 to grounded contact tongue 534 of relay 405 now energized since a white area is being scanned. Thus, the projector 264 continues to move to the feed mark accompanying the first code mark combination of the new line. However, when contact 431 is now operated by cam 371 with contact 430 closed by cam 435, contact 416 of polar relay 417 will move against its left-hand contact as the left-hand winding of relay 417 receives a pluse completed because contact tongue 419 of relay 405 is on its back contact since transmitting relay 401 is at this time energized due to the scanning of the next feed mark. This stops advancement of the projector 264 and the first code mark combination of the new line is transmitted.

An explanation will now be given of the transmission of a figures shift signal. It will be assumed that the letters shift signal was at some time previously transmitted as will later be described. During the first half of the start impulse period, scanning disc 258—A (Fig. 16A) by means of transparent area 294—S scans the sixth code mark or shift area and senses a black code mark which is indicative of a figures shift condition. At this time, of course, shutter 287—A (Fig. 19A) places aperture 591 in its scanning position. It should be mentioned that the high portion of cam 594 retains contact 593 closed during the stop impulse period and for one-half of the start impulse period and thus during this time shutter 287—A is in its feed mark or sixth code mark scanning position. During the first half of the start impulse, cam 571 closes contacts 572, 573, and since at this time the sixth code mark is being scanned, a circuit may be traced as follows: From battery, through contact tongue 570 of relay 407, over lead 574, through the left-hand winding of polar relay 576, through closed contact 572, and over lead 577 to grounded contact tongue 419 of relay 405. Contact tongue 578 of polar relay previous to this has been resting on its right-hand contact tongue, and condenser 569 has been receiving a charge from battery, through the left-hand winding of relay 519, over lead 579. Contact tongue 578 now moves against its left-hand contact and condenser 569 discharges through the left-hand winding of relay 517.

Relay 517 now operates and locks up through its right-hand winding, through contact tongue 581, over lead 582, and through closed contact 583 operable by cam 584. The signal path now extends as follows: From battery 546, through transmitting contact 586 of figures shift cam 587, through make-before-break contact 516 of relay 517, now operated, through make-before-break contact 518 of relay 519, through make-before-break contact 521 of relay 522 and over lead 523 to signal line 402. It will be noted that at this time, the transmitting circuit for relay 401 which extended over lead 514 is at this time broken due to the operation of make-before-break contact 516 of relay 517 so that relay 401 cannot send signals to the line. Cam 587 now operates contact 586 and causes transmission of a figures shift signal.

During the start interval, contact 588 is opened by cam 526 and contact 586 is opened by cam 587, so that the energization of relay 517 during the start interval has no effect on start impulse transmission. Relay 517 remains operated for the entire cycle while the figures shift signal is being transmitted until cam 584 opens contact 583. During this time contact tongue 553 of relay 517 is in its attracted position and prevents travel of the projector by blocking completion of the initially described circuit for magnet 314. Just after contact 414 is closed by cam 370 and prior to the time cam 571 operates contacts 572, 573, cam 584 will operate contact 583 and break the locking circuit for relay 517 which now releases. Relay 401 now gains control of the line as make-before-break contact 516 of relay 517 moves to its unattracted position and enables transmission of the first code signals accompanying the sixth code mark which caused transmission of the figures shift signal.

When the sixth code mark is not printed, indicating a change from a figures to a letters condition, the sixth code area is scanned, and since this area is not printed relay 401 will be unoperated and relay 405 will be operated. The result of this is that when cam 571 closes contacts 572, 573, a circuit is now made from grounded contact tongue 419 of relay 405, over lead 566, through contact 573, through the right-hand winding of polar relay 576, over lead 574, and through contact tongue 570 to battery. This causes contact tongue 578 of polar relay 576 to move against its right-hand contact and charge condenser 569 through the left-hand winding of relay 519, over lead 579. As relay 519 operates, a signaling circuit is now established as follows: From battery 546, through transmitting contact 588 controlled by cam 526, through make-before-break contact 518 now attracted by relay 519, through make-before-break contact 521 of relay 522, and over lead 523 to line 402. Cam 526 now functions to send the all marking or letters shift signal to line 402 by operation of contact 588. When relay 519 operated, it locked up through its right-hand winding through contact tongue 590 and through contact 593 controlled by cam 584. Contact tongue 553 is now held attracted by relay 517 preventing the release of the projector by operation of projector magnet 314 over its initially described operating circuit. Cam 584 releases relay 519 by opening contact 593 as was described above in connection with relay 517. After the letters shift signal is transmitted, the code marks accompanying the first appearance of the letters shift characters is now transmitted. In order to prevent polar relay 576 from being operated during abnormal spacing or when the end of line is scanned, contact tongue 570 of relay 407 is attracted under such conditions. Contact 538 of contact bank 548 is opened when the projector 264 reaches its beginning of line position to prevent operation of relay 522 under such conditions so that a second carriage return signal will not be transmitted.

Continuous feed out of a page form is accomplished when the last line of a page is scanned by providing a black margin feed mark under plate 281 where plate 282 is slotted at 283. This margin feed mark would be in direct line with the margin feed marks of the page form. Thus, after the last line is scanned and the projector is returned to the beginning of line position, the line feed mechanism will continuously feed out the page form until the painted margin feed mark is scanned. A suitable alarm device could be provided to indicate that the end of the page form has been reached.

Various changes and modifications may be made in the herein described invention without departing from the spirit or scope thereof.

What is claimed is:

1. In a page printer, a main selector means, a series of character elements individually selectable by said selector means, an auxiliary selector means operable under the control of said main selector means, a feed code marking element, a series of code marking elements selectively controlled by said auxiliary selector means, and a printing bail cyclically operable for actuating a selected character element to print a character on a page form, for actuating said selectively controlled code marking elements to print code marks on said page form which corresponds to the character printed in the same cycle of operations, and for actuating said feed code marking element to print feed marks on said page form.

2. In a page printer, a main selector means, a series of character elements individually selected by said selector means, an auxiliary selector means operable under the control of said main selector means, a feed code marking element, a series of code marking elements controlled by said auxiliary selector means, a printing bail cyclically operable for actuating a selected character element to print a character on the front of a page form and for actuating said selectively controlled marking elements, means for causing said code marking elements upon such actuation to print code marks on the rear of said page form which corresponds to the character printed on the front of the page form in the same cycle of operations, and means controlled by said printing bail for causing said feed code marking element to print feed marks on the rear of said page form.

3. In a page printer, a main selector means, a series of character elements individually selected by said selector means, an auxiliary selector means operable under the control of said main selector means, a feed code marking element, a series of code marking elements controlled by said auxiliary selector means, a printing bail cyclically operable for actuating a selected character element to print a character on the front of a page form, for actuating said feed code marking element and for actuating said selectively controlled marking elements, and inking means disposed at the rear of said page form for causing said code marking elements upon such actuation to print code marks on the rear of said page form which corresponds to the character printed on the front of the page form in the same cycle of operations and for causing said actuated feed code marking element to print feed marks on the rear of said page form.

4. In a page printer, a main selector means, a series of character elements individually selected by said selector means, an auxiliary selector means operable under the control of said main selector means, a feed code marking element, a series of code marking elements controlled by said auxiliary selector means, a printing bail cyclically operable for actuating a selected character element to print a character on the front of a page form, for actuating said feed code marking element and for actuating said selectively controlled marking elements, and stamp pad means disposed at the rear of said page form for causing said code marking elements upon such actuation to print code marks on the rear of said page form which corresponds to the character printed on the front of the page form in the same cycle of operations and for causing said actuated feed code marking element to print feed marks on the rear of said page form.

5. In a page printer, a main selector means, a series of character elements individually selected by said selector means, an auxiliary selector means operable under the control of said main selector means, a feed code marking element, a series of code marking elements controlled by said auxiliary selector means, a printing bail cyclically operable for actuating a selected character element to print a character on the front of a page form, for actuating said feed code marking element and for actuating said selectively controlled marking elements, and ribbon means disposed at the rear of said page form for causing said code marking elements upon such actuation to print code marks on the rear of said page form which corresponds to the character printed on the front of the page form in the same cycle of operations and for causing said actuated feed code marking element to print feed marks on the rear of said page form.

6. In a type wheel page printer, a type wheel, a plurality of character elements supported by said type wheel, said type wheel being releasable for rotation in each operation of said printer, a main selector means for determining the stop position of said type wheel, an auxiliary selector mechanism operable under the control of said main selector means, a series of code marking elements selectively controlled by said auxiliary selector mechanism, and a printing means cyclically operable for actuating a selected character element determined by the stop position of said type wheel for printing a character on a page form and for actuating said selectively controlled marking elements to print code marks on said page form which correspond to the character printed in the same cycle of operations.

7. In a type wheel page printer, a type wheel, a plurality of character elements carried by said type wheel, said type wheel being releasable for rotation in each operation of said printer, a main selector means for determining the stop position of said type wheel, an auxiliary selector mechanism operable under the control of said main selector means including a first series of slides operable by said main selector means, a second series of slides, means for transferring a selection from said first series of slides to said second series of slides, a third series of slides, means for transferring a selection from said second series of slides to said third series of slides a series of code marking elements selectively controlled by said third series of slides, and printing means cyclically operable for actuating a selected character element determined by the stop position of said type wheel for printing a character on a page form and for actuating said selectively controlled code marking elements to print code marks on said page form which correspond to the character printed in the same cycle of operations.

8. In a type wheel page printer, a type wheel, a plurality of character elements supported by said type wheel, said type wheel being releasable for rotation in each operation of said printer, a main selector means for determining the stop position of said type wheel, an auxiliary selector mechanism operable under the control of said main selector means, a series of code marking elements selectively controlled by said auxiliary selector mechanism, page form supporting means, a printing means cyclically operable for actuating a selected character element determined by the stop position of said type wheel for printing a character on the front of said page form and from actuating said selectively controlled code marking elements, and means for causing said code marking elements upon such actuation to print code marks on the rear of said page form which correspond to the character printed on the front of the page form in the same cycle of operations.

9. In a type wheel page printer, a type wheel, a plurality of character elements supported by said type wheel, said type wheel being releasable for rotation in each operation of said printer, a main selector means for determining the stop position of said type wheel, an auxiliary selector mechanism operable under the control of said main selector means, a series of code marking elements selectively controlled by said auxiliary selector mechanism, page form supporting means, a main printing means cyclically operable for actuating a selected character element determined by the stop position of said type wheel for printing a character on a page form, and an auxiliary printing means controlled by said main printing means for actuating selected code marking elements for printing code marks on said page form which corresponds to the character printed on said page form in the same cycle of operations.

10. A page printer including selector means, a series of code marking elements selectively controlled by said selector means, a feed marking element, page form supporing means, and printing means cyclically operable for actuating selected code mark elements and for universally actuating said feed marking element to thereby print code marks and accompanying feed marks on said page form.

11. A telegraph page printer including a selector mechanism, a series of vanes settable under the control of said selector mechanism, a series of character elements selectable according to the setting of said vanes, a secondary selector mechanism operable under the control of said vanes, a series of code marking elements selectively controlled by said secondary selector mechanism, a feed code marking element, page form supporting means, and cyclically operable printing means for actuating a selected character element for printing a character on a page form, for actuating all code marking elements selected for operation to print code marks on said page form which correspond to the character printed on the page form in the came cycle of operations, and for actuating said feed code marking element to print feed marks on the page form.

12. A telegraph page printer including a selector mechanism, a series of vanes settable under the control of said selector mechanism, a series of character elements selectable according to the setting of said vanes, a secondary selector mechanism operable under the control of said vanes, a series of code marking elements selectively controlled by said secondary selector mechanism, a feed code marking element, page form supporting means, a printing means cyclically operable for actuating a selected character element on the front of a page form and for actuating selected code marking elements, and means for causing said code marking elements to print code marks on the rear of said page form which correspond to the character printed on the front of the page form in the same cycle of operations, and for actuating said feed code marking element to print feed marks on the page form.

13. A telegraph page printer including a first selector mechanism, a series of vanes settable under the control of said selector mechanism, a secondary selector mechanism operable under the control of said first selector mechanism according to the setting of said vanes, a series of code marking elements selectively controlled by said secondary selector mechanism, a feed code marking element, page form supporting means, and printing means cyclically operable for actuating selected code marking elements to print code marks on a page form in each printing operation, and for actuating said feed code marking element to print feed marks on the page form.

14. In a telegraph page printer, a selector mechanism, a series of vanes settable under the control of said selector mechanism, page form supporting means, a type basket, a secondary selector mechanism movable with said type basket and operable under the control of said vanes, said type basket being adapted to traverse said page form supporting means, a series of code marking levers operable by said secondary selector mechanism, a feed code marking element, and printing means cyclically operable for actuating selected code marking elements to print code marks on a page form in each printing operation, and for actuating said feed code marking element to print feed marks on the page form.

15. In a telegraph page printer, a selector mechanism, a series of vanes settable under the control of said selector mechanism, page form supporting means, a frame shiftable vertically with said page form supporting means to different case positions, a horizontally movable secondary selector mechanism for traversing said page form supporting means and operable under the control of said vanes, a series of code marking levers carried by said frame and operable under the control of said secondary selector mechanism, means associated with said secondary selector mechanism to enable said secondary selector mechanism to operate said code marking levers in either of their case positions, a feed code marking element, and a cyclically operable printing means for actuating selected code marking levers to print code marks on a page form in each printing operation, and for actuating said feed code marking element to print feed marks on the page form.

MARTHA W. C. POTTS,

*Executrix under the Last Will and Testament of Louis M. Potts, Deceased.*

REFERENCES CITED

The following references are of record in the file of this patent:

UNITED STATES PATENTS

| Number | Name | Date |
|---|---|---|
| 1,936,956 | Rothermel | Nov. 28, 1933 |
| 2,114,295 | Green | Apr. 19, 1938 |
| 2,183,559 | Green | Dec. 19, 1939 |
| 2,252,232 | Noxon et al. | Aug. 12, 1941 |
| 2,380,667 | Morrison | July 31, 1945 |
| 2,390,664 | Potts | Dec. 11, 1945 |
| 2,397,202 | Potts | Mar. 26, 1946 |

Certificate of Correction

Patent No. 2,540,287 February 6, 1951

LOUIS M. POTTS, DECEASED, BY MARTHA W. C. POTTS, EXECUTRIX

It is hereby certified that error appears in the printed specification of the above numbered patent requiring correction as follows:

Column 2, line 32, for "April 18, 1932" read *April 18, 1933*; column 22, line 17, for the word "not" read *now*; line 43, for "pluse" read *pulse*; column 26, line 31, for "from" read *for*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*